US012525167B2

(12) United States Patent
Han et al.

(10) Patent No.: US 12,525,167 B2

(45) Date of Patent: Jan. 13, 2026

(54) GAMMA REFERENCE VOLTAGE OUTPUT CIRCUIT AND DISPLAY DEVICE INCLUDING THE SAME

(71) Applicant: LG Display Co., Ltd., Seoul (KR)

(72) Inventors: Jae Won Han, Paju-si (KR); Jung Jae Kim, Paju-si (KR); Min Gyu Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/938,091

(22) Filed: Nov. 5, 2024

(65) Prior Publication Data

US 2025/0191517 A1 Jun. 12, 2025

(30) Foreign Application Priority Data

Dec. 6, 2023 (KR) ........................ 10-2023-0175780

(51) Int. Cl.
*G09G 3/20* (2006.01)

(52) U.S. Cl.
CPC ..... *G09G 3/2092* (2013.01); *G09G 2310/027* (2013.01); *G09G 2310/0291* (2013.01); *G09G 2330/025* (2013.01); *G09G 2330/028* (2013.01); *G09G 2330/12* (2013.01)

(58) Field of Classification Search
CPC ........... G09G 3/2092; G09G 2310/027; G09G 2310/0291; G09G 2330/025; G09G 2330/028; G09G 2330/12; G09G 3/20; G09G 3/32; G09G 2320/0673
See application file for complete search history.

(56) References Cited

U.S. PATENT DOCUMENTS

2003/0122814 A1* 7/2003 Yer ...................... G09G 3/3696 345/211
2007/0229439 A1* 10/2007 Wang .................. G09G 3/3685 345/100
2010/0007680 A1* 1/2010 Yu ........................... G09G 5/10 327/530

(Continued)

FOREIGN PATENT DOCUMENTS

KR 10-2010-0006035 A 1/2010
KR 10-2016-0089947 A 7/2016

*Primary Examiner* — Antonio Xavier

(74) *Attorney, Agent, or Firm* — Birch, Stewart, Kolasch & Birch, LLP

(57) ABSTRACT

Discussed are a gamma reference voltage output circuit and a display device. The gamma reference voltage output circuit includes an (N)th operational amplifier configured to output an (N)th gamma reference voltage through an (N)th output terminal, where N is a natural number, an (N+1)th operational amplifier configured to output an (N+1)th gamma reference voltage being lower than the (N)th gamma reference voltage through its (N+1)th output terminal, an (N+2)th operational amplifier configured to output an (N+2)th gamma reference voltage being lower than the (N+1)th gamma reference voltage to an (N+2)th output terminal, and one or more connection nodes to which a power terminal of one of adjacent operational amplifiers in the (N)th operational amplifier, the (N+1)th operational amplifier, and the (N+2)th operational amplifier is connected to an output terminal of another operational amplifier.

19 Claims, 24 Drawing Sheets

(56) References Cited

U.S. PATENT DOCUMENTS

| | | | | |
|---|---|---|---|---|
| 2011/0175942 | A1* | 7/2011 | Ahn | G09G 3/3688 345/690 |
| 2020/0211457 | A1* | 7/2020 | Kim | G09G 3/3233 |
| 2021/0134239 | A1* | 5/2021 | Wang | G09G 3/20 |

* cited by examiner

GAMMA REFERENCE VOLTAGE OUTPUT CIRCUIT AND DISPLAY DEVICE INCLUDING THE SAME

CROSS-REFERENCE TO RELATED APPLICATION

This application claims priority to Korean Patent Application No. 10-2023-0175780, filed in the Republic of Korea on Dec. 6, 2023, the entire disclosure of which is hereby expressly incorporated by reference into the present application.

BACKGROUND

Technical Field

The present disclosure relates to a gamma reference voltage output circuit and a display device including the same.

Discussion of the Related Art

A variety of flat panel displays are known, including electroluminescence displays (ELD) such as liquid crystal displays (LCD) and organic light-emitting diode (OLED) displays, field emission displays (FED), plasma display panels (PDP), and electrophoresis displays (EPD).

A display device includes a display panel having pixels arranged to display an input image, and a display panel driving circuit that writes data to the pixels of the display panel. The display panel driving circuit includes a data driving circuit that supplies a data signal of pixel data to data lines of the display panel, and a gate driving circuit that supplies a gate signal to gate lines of the display panel. The display panel driving circuit further includes a gamma reference voltage output circuit that supplies a gamma reference voltage to the data driving circuit.

SUMMARY OF THE DISCLOSURE

The present disclosure has been made in an effort to address aforementioned necessities and/or drawbacks associated with the related art.

The present disclosure provides a gamma reference voltage output circuit for sensing an abnormal output, and a display device including the same.

The problems and limitations to be solved or addressed by the present disclosure are not limited to those mentioned above, and other problems and limitations not mentioned will be clearly understood by those skilled in the art from the following description.

A gamma reference voltage output circuit according to one embodiment of the present disclosure includes an (N)th operational amplifier configured to output an (N)th gamma reference voltage through an (N)th output terminal, where N is a natural number; an (N+1)th operational amplifier configured to output an (N+1)th gamma reference voltage being lower than the (N)th gamma reference voltage through an (N+1)th output terminal, an (N+2)th operational amplifier configured to output an (N+2)th gamma reference voltage being lower than the (N+1)th gamma reference voltage to an (N+2)th output terminal, and one or more connection nodes to which a power terminal of one of the adjacent operational amplifiers in the (N)th operational amplifier, the (N+1)th operational amplifier, and the (N+2)th operational amplifier is connected to an output terminal of the other operational amplifier.

Each of the (N)th operational amplifier, the (N+1)th operational amplifier, and the (N+2)th operational amplifier can include a first power terminal and a second power terminal. The connection nodes can include a first connection node configured to connect the (N)th output terminal to the first power terminal of the (N+1)th operational amplifier, and a second connection node configured to connect the (N+1)th output terminal to the first power terminal of the (N+2)th operational amplifier.

A driving voltage can be applied to the first power terminal of the (N)th operational amplifier, and a ground voltage can be applied to the second power terminal of the (N)th operational amplifier. The ground voltage can be applied to the second power terminal of the (N+2)th operational amplifier.

The (N)th operational amplifier can further include a first transistor connected between the first power terminal and the (N)th output terminal of the (N)th operational amplifier; a second transistor connected between the (N)th output terminal and the second power terminal of the (N)th operational amplifier; a control part configured to control a gate voltage of each of the first transistor of the (N)th operational amplifier and the second transistor of the (N)th operational amplifier; a first sensing part configured to sense a current flowing through the first transistor of the (N)th operational amplifier; and a second sensing part configured to sense a current flowing through the second transistor of the (N)th operational amplifier.

The (N+1)th operational amplifier can further include a first transistor connected between the first power terminal and the (N+1)th output terminal of the (N+1)th operational amplifier; a second transistor connected between the (N+1)th output terminal, and the second power terminal of the (N+1)th operational amplifier; a control part configured to control a gate voltage of each of the first transistor of the (N+1)th operational amplifier and the second transistor of the (N+1)th operational amplifier; and a sensing part configured to sense a current flowing through the second transistor of the (N+1)th operational amplifier.

The (N+2)th operational amplifier can further include a first transistor connected between the first power terminal and the (N+2)th output terminal of the (N+2)th operational amplifier; a second transistor connected between the (N+2)th output terminal, and the second power terminal of the (N+2)th operational amplifier; a control part configured to control a gate voltage of each of the first transistor of the (N+2)th operational amplifier and the second transistor of the (N+2)th operational amplifier; and a sensing part configured to sense a current flowing through the second transistor of the (N+2)th operational amplifier.

Each of the (N)th operational amplifier, the (N+1)th operational amplifier, and the (N+2) operational amplifier can include a first power terminal and a second power terminal. The connection nodes can include a first connection node configured to connect the second power terminal of the (N)th operational amplifier to the (N+1)th output terminal, and a second connection node configured to connect the second power terminal of the (N+1)th operational amplifier to the (N+2)th output terminal.

A driving voltage can be applied to the first power terminal of the (N)th operational amplifier, and the driving voltage can be applied to the first power terminal of the (N+2)th operational amplifier. A ground voltage can be applied to the second power terminal of the (N+2)th operational amplifier.

The (N)th operational amplifier can further include a first transistor connected between the first power terminal and the (N)th output terminal of the (N)th operational amplifier; a second transistor connected between the (N)th output terminal, and the second power terminal of the (N)th operational amplifier; a control part configured to control a gate voltage of each of the first transistor of the (N)th operational amplifier and the second transistor of the (N)th operational amplifier; and a sensing part configured to sense a current flowing through the first transistor of the (N)th operational amplifier. The (N+1)th operational amplifier can further include a first transistor connected between the first power terminal and the (N+1)th output terminal of the (N+1)th operational amplifier; a second transistor connected between the (N+1)th output terminal, and the second power terminal of the (N+1)th operational amplifier; a control part configured to control a gate voltage of each of the first transistor of the (N+1)th operational amplifier and the second transistor of the (N+1)th operational amplifier; and a sensing part configured to sense a current flowing through the first transistor of the (N+1)th operational amplifier.

The (N+2)th operational amplifier can further include a first transistor connected between the first power terminal and the (N+2)th output terminal of the (N+2)th operational amplifier; a second transistor connected between the (N+2) th output terminal, and the second power terminal of the (N+2)th operational amplifier; a control part configured to control a gate voltage of each of the first transistor of the (N+2)th operational amplifier and the second transistor of the (N+2)th operational amplifier; a first sensing part configured to sense a current flowing through the first transistor of the (N+2)th operational amplifier; and a second sensing part configured to sense a current flowing through the second transistor of the (N+2)th operational amplifier.

Each of the (N)th operational amplifier, the (N+1)th operational amplifier, and the (N+2) operational amplifier can include a first power terminal and a second power terminal. The connection nodes can include a first-first connection node configured to connect the (N)th output terminal to the first power terminal of the (N+1)th operational amplifier; a first-second connection node configured to connect the (N+1)th output terminal to the first power terminal of the (N+2) operational amplifier; a second-first connection node configured to connect the second power terminal of the (N)th operational amplifier to the (N+1)th output terminal; and a second-second connection node configured to connect the second power terminal of the (N+1)th operational amplifier to the (N+2)th output terminal.

A driving voltage can be applied to the first power terminal of the (N)th operational amplifier, and the ground voltage can be applied to the second power terminal of the (N+2)th operational amplifier.

The (N)th operational amplifier can further include a first transistor connected between the first power terminal and the (N)th output terminal of the (N)th operational amplifier; a second transistor connected between the (N)th output terminal, and the second power terminal of the (N)th operational amplifier; a control part configured to control a gate voltage of each of the first transistor of the (N)th operational amplifier and the second transistor of the (N)th operational amplifier; and a sensing part configured to sense a current flowing through the first transistor of the (N)th operational amplifier. The (N+1)th operational amplifier can further include a first transistor connected between the first power terminal and the (N+1)th output terminal of the (N+1)th operational amplifier; a second transistor connected between the (N+1)th output terminal, and the second power terminal of the (N+1)th operational amplifier; and a control part configured to control a gate voltage of each of the first transistor of the (N+1)th operational amplifier and the second transistor of the (N+1)th operational amplifier.

The (N+2)th operational amplifier can further include a first transistor connected between the first power terminal and the (N+2)th output terminal of the (N+2)th operational amplifier; a second transistor connected between the (N+2) th output terminal, and the second power terminal of the (N+2)th operational amplifier; a control part configured to control a gate voltage of each of the first transistor of the (N+2)th operational amplifier and the second transistor of the (N+2)th operational amplifier; and a second sensing part configured to sense a current flowing through the second transistor of the (N+2)th operational amplifier.

Each of the (N)th operational amplifier, the (N+1)th operational amplifier, and the (N+2)th operational amplifier can include a first transistor connected between the first power terminal and a corresponding output terminal; a second transistor connected between the corresponding output terminal and the second power terminal; and a control part configured to control a gate voltage of each of the first transistor and the second transistor.

The gamma reference voltage output circuit can further include a sensing circuit connected to at least one of the (N)th output terminal, the (N+1)th output terminal, and the (N+2)th output terminal.

The sensing circuit can include a first diode including a cathode electrode connected to the (N)th output terminal, and an anode electrode to which a first reference voltage is applied; and an operational amplifier including a non-inverting input terminal to which a second reference voltage is input, an inverting input terminal connected to the anode electrode of the first diode, and an output terminal from which an error signal is output.

The sensing circuit can include a second diode including an anode electrode connected to the (N+2)th output terminal, and a cathode electrode to which a third reference voltage is applied; and an operational amplifier including an inverting input terminal to which a fourth reference voltage is input, a non-inverting input terminal connected to the cathode electrode of the second diode, and an output terminal from which an error signal is output.

A gamma reference voltage output circuit according to another embodiment of the present disclosure includes: an (N)th operational amplifier configured to output an (N)th gamma reference voltage through an (N)th output terminal, where N is a natural number; an (N+1)th operational amplifier configured to output an (N+1)th gamma reference voltage that is lower than the (N)th gamma reference voltage through an (N+1)th output terminal; an (N+2)th operational amplifier configured to output an (N+2)th gamma reference voltage that is lower than the (N+1)th gamma reference voltage to an (N+2)th output terminal; and a sensing circuit connected to at least one of the (N)th output terminal, the (N+1)th output terminal, and the (N+2)th output terminal.

The sensing circuit can include a first-first diode including a cathode electrode connected to the (N)th output terminal, and an anode electrode to which a first reference voltage is applied; a first-second diode including a cathode electrode connected to the (N+1)th output terminal, and an anode electrode to which the first reference voltage is applied; a first-third diode including a cathode electrode connected to the (N+2)th output terminal, and an anode electrode to which the first reference voltage is applied; and an operational amplifier including a non-inverting input terminal into which a second reference voltage is input, an inverting input terminal connected in common to anode electrodes of the first-first to first-third diodes, and an output terminal configured to output an error signal.

The sensing circuit further can include a second-first diode including an anode electrode connected to the (N)th output terminal, and a cathode electrode to which a third reference voltage is applied; a second-second diode including an anode electrode connected to the (N+1)th output terminal, and a cathode electrode to which the third reference voltage is applied; a second-third diode including an anode electrode connected to the (N+2)th output terminal, and a cathode electrode to which the third reference voltage is applied; and an operational amplifier including an inverting input terminal to which a fourth reference voltage is input, a non-inverting input terminal connected in common to the cathode electrodes of the second-first to second-third diodes, and an output terminal configured to output an error signal.

A display device according to one embodiment of the present disclosure includes the gamma reference voltage output circuit; a data driving circuit configured to convert pixel data into a data voltage based on the gamma reference voltages; and a display panel having a plurality of data lines disposed thereon to which the data voltage is applied.

One or more aspects of the present disclosure can implement a low-power display device that can sense an abnormal output of the gamma reference voltage output circuit, and can protect the driving circuit of the display device from an overcurrent.

One or more aspects of the present disclosure can enable the operational amplifiers to output within a voltage range of each of the gamma reference voltages and sense an abnormal output current by allowing the power to the operational amplifier used as the output buffer of the gamma reference voltage output circuit to employ as the output voltage of the adjacent operational amplifier.

One or more aspects of the present disclosure can sense an abnormal output current of all output terminals by the use of the sensing circuit in some of the operational amplifiers used as output buffers of the gamma reference voltage output circuit or a small number of sensing circuits connected to the output terminals.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF THE EMBODIMENTS

Figure 1:
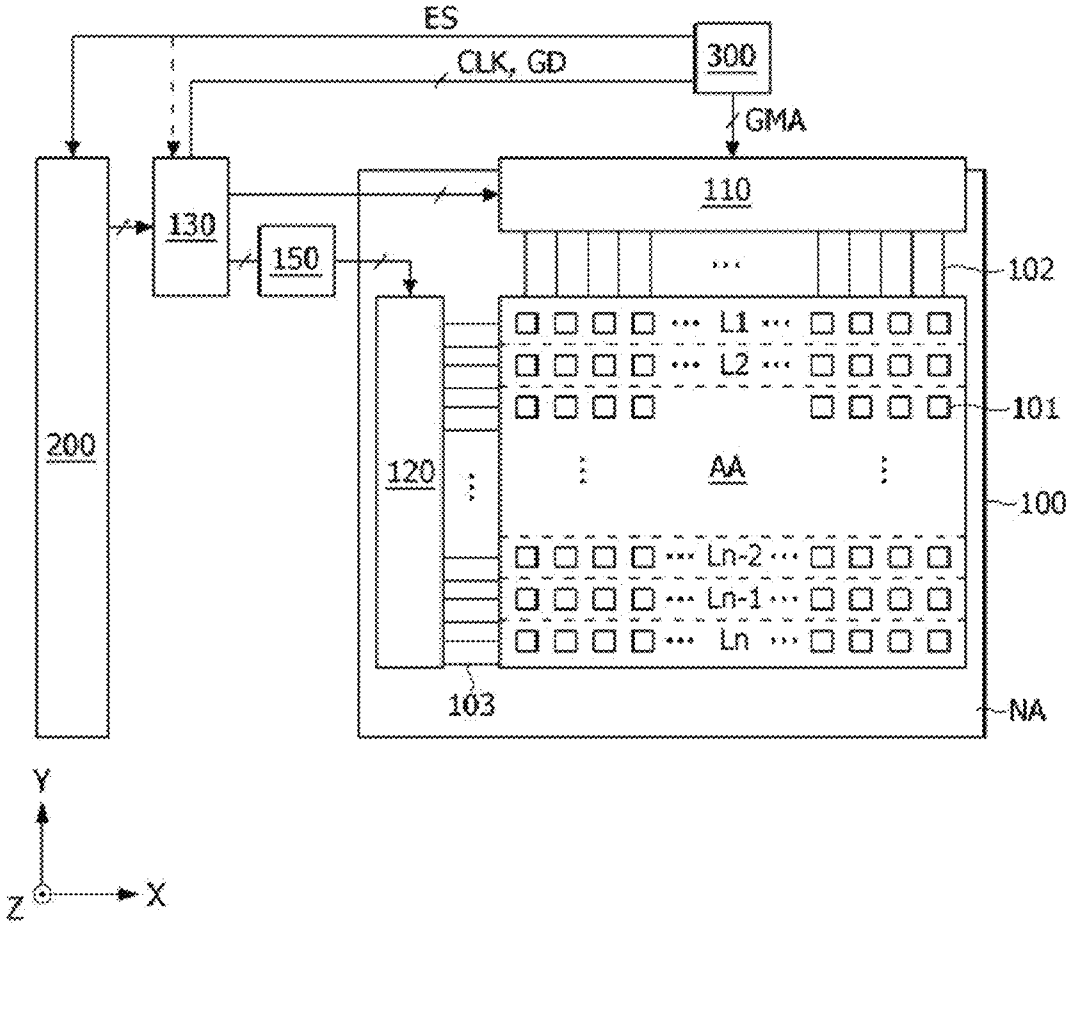
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted, or may be provided briefly to avoid unnecessarily obscuring the subject matter of the present disclosure.

The terms such as “comprising,” “including,” “having,” and “comprising” used herein are generally intended to allow other components to be added unless the terms are used with the term “only.” Any references to singular can include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components can be interposed between them, unless “immediately” or “directly” is used.

When a temporal antecedent relationship is described, such as “after”, “following”, “next to”, “before”, or the like, it may not be continuous on a time base unless “immediately” or “directly” is used.

The terms “first,” “second,” and the like can be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons can flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes can flow from a source to a drain. In the p-channel transistor, since holes flow from the source to the drain, current flows from the source to the drain. It should be noted that a source and a drain of a transistor are not fixed. For example, a source and a drain can be changed according to an applied voltage. Therefore, the disclosure is not limited to a source and a drain of a transistor. In the following description, a source and a drain of a transistor will be referred to as a first electrode and a second electrode.

A gate signal can swing between a gate-on voltage and a gate-off voltage. A transistor is turned on in response to a gate-on voltage and is turned off in response to a gate-off voltage. In the case of an n-channel transistor, the gate-on voltage can be a gate high voltage VGH, and the gate-off voltage can be a gate low voltage VGL. In the case of a p-channel transistor, the gate-on voltage can be the gate low voltage VGL, and the gate-off voltage can be the gate high voltage VGH.

Hereinafter, various embodiments of the present disclosure will be described in detail with reference to the accompanying drawings. All the components of each display device according to all embodiments of the present disclosure are operatively coupled and configured.

FIG. 1 is a block diagram illustrating a display device according to one embodiment of the present disclosure.

Referring to FIG. 1, the display device according to an embodiment of the present disclosure includes a display panel 100, a display panel driving circuit for writing pixel data to pixels 101 of the display panel 100, and a power supply for generating power necessary for driving the pixels 101 and the display panel driving circuit.

A substrate of the display panel 100 can be, but is not limited to, a plastic substrate, a thin glass substrate, or a metal substrate. The display panel 100 can be, but is not limited to, a rectangular shaped panel having a length in the X-axis direction (e.g., first direction), a width in the Y-axis direction (e.g., second direction), and a thickness in the Z-axis direction (e.g., third direction). For example, at least some portions of the display panel 100 can have a curved outer portion.

The display panel 100 can be implemented as a non-transmissive display panel or a transmissive display panel. The transmissive display panel can be applied to a transparent display device in which an image is displayed on a screen and an actual object is visible beyond the display panel. The display panel 100 can be made as a flexible display panel. The display panel 100 can be made of a stretchable panel that can be stretched.

A display area (or active area) AA of the display panel 100 includes a pixel array for displaying an input image thereon. The pixel array includes a plurality of data lines 102, a plurality of gate lines 103 intersecting the data lines 102, and the pixels 101 arranged in a matrix form. The display panel 100 can further include power wires commonly connected to the pixels 101. The power wires are commonly connected to pixel circuits and supply a constant voltage necessary for driving the pixels 101 to the pixels. The power wires can be implemented as long stripes of wires along either the first or second direction, or as mesh wires where the wires in the first direction and the wires in the second direction are electrically connected.

Each of the pixels 101 can be divided into a red sub-pixel, a green sub-pixel, and a blue sub-pixel for color implementation. Each of the pixels can further include a white sub-pixel. Each sub-pixel includes a pixel circuit for driving a light-emitting element. Each of the pixel circuits is connected to the data lines, the gate lines, and the power wires. The power wires can supply a constant voltage to all of the pixels, such as a pixel driving voltage, a cathode voltage, or the like. Hereinafter, a "pixel" can be interpreted as having the same meaning as a "sub-pixel."

The pixel array includes a plurality of pixel L1 to Ln, where n is a natural number such as an integer greater than 1. Each of the pixel lines L1 to Ln includes one line of pixels arranged along the line direction (X-axis direction) in the pixel array of the display panel 100. The pixels arranged in one pixel line share the gate lines 103. The sub-pixels arranged in the second direction (Y) along the data line direction share the same data line 102. One horizontal period is a time obtained by dividing one frame period by the total number of the pixel lines L1 to Ln.

The power supply outputs constant voltages (or direct current (DC) voltages) required for driving the pixel array and the display panel driving circuit of the display panel 100 by using a DC-DC converter. The DC-DC converter can include a charge pump, a regulator, a buck converter, a boost converter, a gamma reference voltage output circuit 300, or the like. The power supply receives a direct current input voltage from a main power source of the host system 200 and outputs constant voltages such as a gamma reference voltage GMA, a gate-low voltage, a gate-high voltage, a pixel driving voltage, a cathode voltage, an integrated circuit (IC) voltage, and the like. The gate-high voltage and the gate-low voltage from the power supply are supplied to a level shifter 150 and the gate driver 120.

The gamma reference voltage output circuit 300 can be implemented as a programmable gamma voltage circuit. The programmable gamma voltage circuit can vary the gamma reference voltage (GMA) according to a value of digital data. The gamma reference voltage (GMA) output from the gamma reference voltage output circuit 300 is supplied to the data driver 110. The gamma reference voltage can be interpreted as a gamma tab voltage.

The display panel driving circuit writes the pixel data of the input image to the pixels of the display panel 100 under the control of the timing controller 130. The display panel driving circuit includes the data driver 110 and the gate driver 120.

The display panel driving circuit can further include a touch sensor driver for driving touch sensors. The data driver 110 and the touch sensor driver can be integrated into a single drive integrated circuit (IC).

The data driver 110 can be integrated into an IC and electrically connected to the data lines of the display panel 100. The data driver 110 receives the pixel data of the input image received as a digital signal from the timing controller 130 and outputs the data voltage. The data driver 110 converts the pixel data of the input image to a gamma compensation voltage using a digital to analog converter (DAC) and outputs the data voltage.

The gamma reference voltage GMA output from the gamma reference voltage output circuit 300 is provided to the data driver 110. The data driver 110 converts the pixel data of the input image to a data voltage based on the gamma reference voltage GMA. The data voltage is supplied to the data lines 102. The gamma reference voltage GMA is divided into the gamma compensation voltage for each grayscale by a voltage divider circuit in the data driver 110, which is supplied to the DAC. The DAC generates the data voltages as the gamma compensation voltages corresponding to the grayscale values of the pixel data. The data voltages output from the DAC are output from the respective data output channels of the data drive 110 to the data lines 102 to the output buffers.

The gate driver 120 can be formed on the display panel 100 together with a thin film transistor (TFT) array of the pixel array and the wires. The gate driver 120 can be disposed in the non-display area NA of the display panel 100 outside the display area AA, or at least a portion thereof can be disposed in the display area AA.

The gate driver 120 can be disposed on either a left non-display area (non-active area) NA or a right non-display area NA outside the display area AA in the display panel 100 to supply the gate signals to the gate lines 103 in a single feeding method. In the single feeding method, the gate signals are applied to one ends of the gate lines. The gate driver 120 can be disposed in the left non-display area NA and the right non-display area NA of the display panel 100 to apply the gate signals to the gate lines 103 in a double feeding method. In the double feeding method, the gate signals are applied simultaneously at both ends of the gate lines 103. At least some circuits of the gate driver 120 can be disposed within the display area AA.

The gate driver 120 can include one or more shift registers. The gate signal can include a scan signal and an emission signal. In this case, the gate driver 120 can include a shift register for sequentially outputting pulses of the scan signal and a shift register for sequentially outputting pulses of the emission signal. The shift register receives a gate shift clock signal through the level shifter 150 to output a pulse of the gate signal, and supplies the gate signal to the gate lines 103 while shifting the pulse.

The timing controller 130 receives from the host system 200 the pixel data of the input image and a timing signal synchronized with the pixel data. The timing signal can include a vertical synchronization signal Vsync, a horizontal synchronization signal Hsync, and a data enable signal DE. Since a vertical period and a horizontal period can be known by counting the data enable signal DE, the vertical synchronization signal Vsync and the horizontal synchronization signal Hsync can be omitted. The data enable signal DE has a period of one horizontal period (1H).

The timing controller 130 controls the display panel driving circuit 110 and 120 by generating signals or timing information for controlling the operation timing of the display panel driving circuit 110 and 120 based on the timing signals (e.g., Vsync, Hsync, and DE) received from the host system 200.

A gate timing control signal generated from the timing controller 130 can be input to the shift register of the gate driver 120 through the level shifter 150. The level shifter 150 can receive the gate timing control signal and generate a clock to provide it to the shift register of the gate driver 120. The input signal to the level shifter 150 is a signal of a digital signal voltage level. The output signal of the level shifter 150 includes a clock of an analog voltage that swings between a gate high voltage and a gate low voltage. The data timing control signal generated from the timing controller 130 is transmitted to the data driver 110.

The timing controller 130 can transmit digital data GD indicative of the voltage level of the gamma reference voltage GMA and a clock CLK synchronized to this digital data to the gamma reference voltage output circuit 300 through a standard interface, for example, an $I^2C$ interface. The digital data GD can change depending on the driving conditions of the data driver 110 and the pixel 101. Therefore, the timing controller 130 can update the digital data GD to change the voltage level of each of the gamma reference voltages GMA input to the data driver 110.

The host system 200 can scale an image signal from a video source to match the resolution of the display panel 100, and can transmit it to the timing controller 130 together with the timing signal.

The gamma reference voltage output circuit 300 includes a sensing circuit connected to at least one of operational amplifiers connected to the output terminals thereof. The sensing circuit senses an abnormal output current in real time and outputs an error signal ES as a specific logic value when an abnormal output is sensed. The abnormal output current can be the current that flows through an output terminal of the gamma reference voltage output circuit 300 when the output terminal is short-circuited to a voltage different from a target voltage of the gamma reference voltage GMA. The gamma reference voltage output circuit 300 can transmit the error signal ES output from the sensing circuit to at least one of the host system 200 and the timing controller 130 through a standard interface, such as, but not limited to, a serial interface such as $I^2C$.

The gamma reference voltage output circuit 300 includes a plurality of operational amplifiers used as output buffers. A power terminal of one of the adjacent operational amplifiers can be connected to an output terminal of another operational amplifier. The gamma reference voltage output circuit 300 can include at least an (N)th (where N is a natural number) operational amplifier for outputting an (N)th gamma reference voltage through an (N)th output terminal, an (N+1)th operational amplifier for outputting an (N+1)th gamma reference voltage lower than the (N)th gamma reference voltage through an (N+1)th output terminal, and an (N+2)th operational amplifier for outputting an (N+2)th gamma reference voltage lower than the (N+1)th gamma reference voltage to the (N+2)th output terminal. The (N)th operational amplifier can output the highest gamma reference voltage, and the (N+2) operational amplifier can output the lowest gamma reference voltage. For example, the (N)th operational amplifier can be a first operational amplifier AMP1 shown in FIG. 2, and the (N+2)th operational amplifier can be a fifth operational amplifier AMP5, but are not limited thereto.

When the host system 200 receives the error signal ES, it can cut off the input voltage that drives the power supply of the display device by cutting off the output of the main power source. When the timing controller 130 receives the error signal ES, it can shut down the power supply of the display device. Therefore, when the error signal ES is output as a specific logical value from the sensing circuit of the gamma reference voltage output circuit 300, heat generation and damage to the display panel driving circuit and the power supply can be prevented because there is no output voltage from the power supply of the display device.

Figure 2:
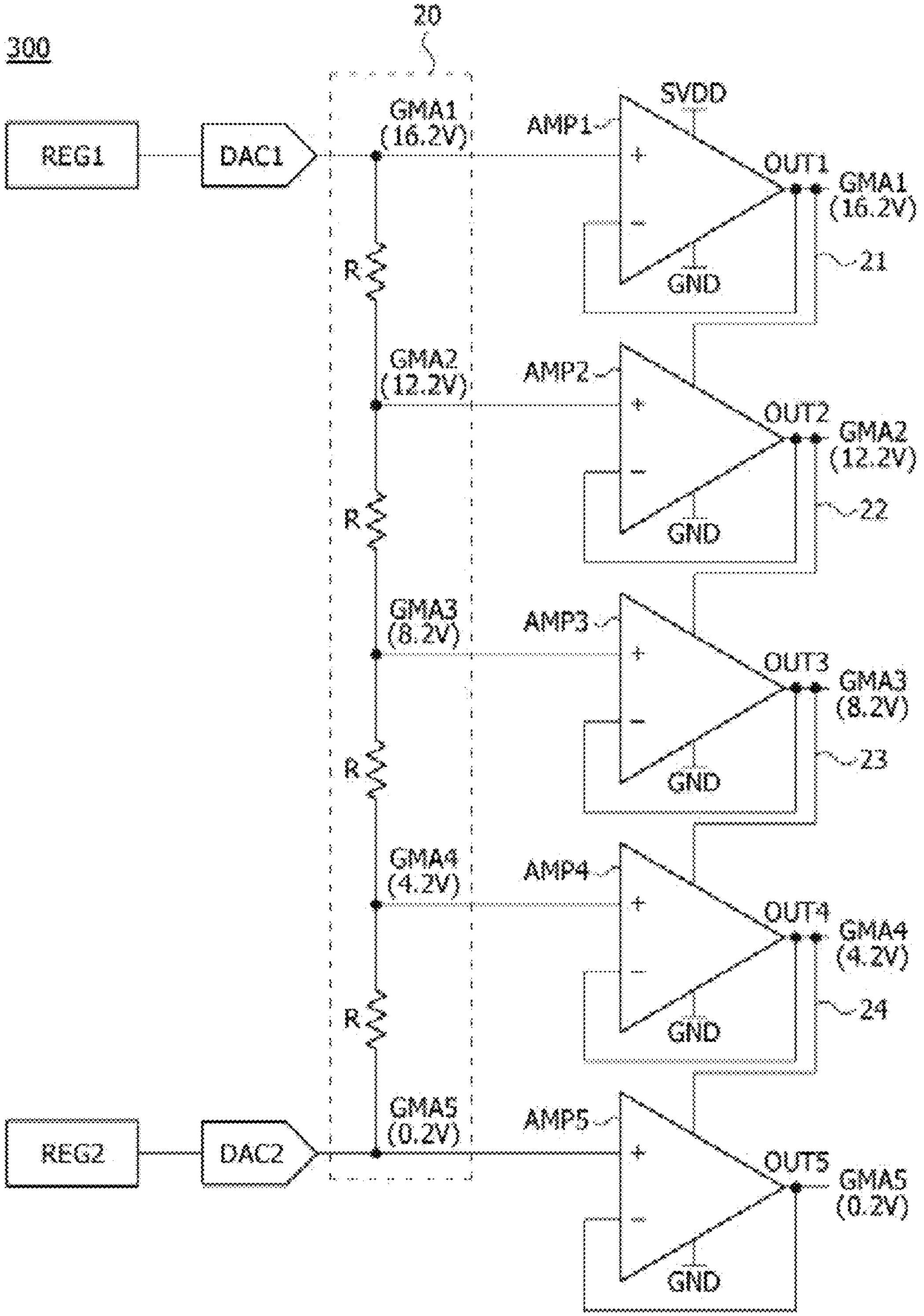
FIG. 2 is a circuit diagram illustrating a gamma reference voltage out circuit according to a first embodiment of the present disclosure.
Figure 3:
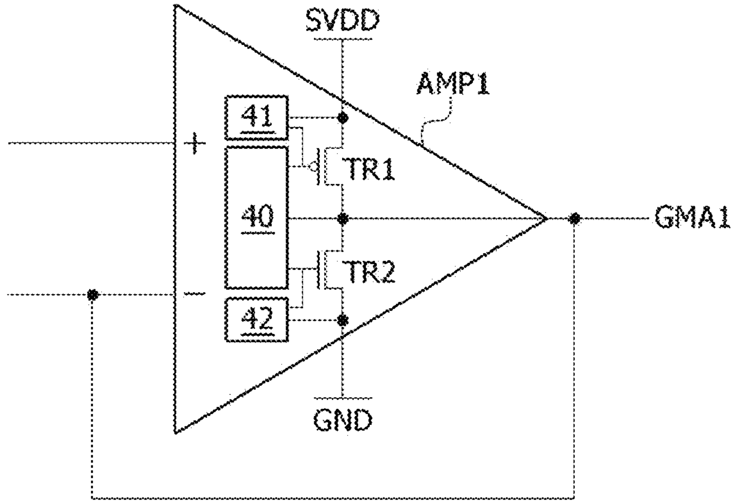
FIG. 3 is a circuit diagram illustrating the sensing circuit of the first operational amplifier shown in FIG. 2.

FIG. 2 is a circuit diagram illustrating one example of the gamma reference voltage output circuit shown in FIG. 1 and illustrates a gamma reference voltage out circuit according to a first embodiment of the present disclosure. FIG. 3 is a circuit diagram illustrating the sensing circuit of the first operational amplifier shown in FIG. 2. In FIG. 2, the gamma reference voltages output from the gamma reference voltage output circuit are exemplified as first to fifth gamma reference voltages GMA1 to GMA5 for convenience, but it should be noted that the present disclosure is not limited thereto. For example, the gamma reference voltage output circuit can include at least an (N)th operational amplifier, an (N+1)th operational amplifier, and an (N+2)th operational amplifier.

Referring to FIG. 2, the gamma reference voltage output circuit 300 includes a plurality of operational amplifiers AMP1 to AMP5, each connected to its respective output terminal. The operational amplifiers AMP1 to AMP5 can be interpreted as buffers or voltage followers.

When N is a natural number greater than or equal to 3, the gamma reference voltage output circuit 300 can include a first operational amplifier for outputting a first gamma reference voltage through a first output terminal, a second operational amplifier for outputting a second gamma reference voltage lower than the first gamma reference voltage through a second output terminal, and an (N)th operational amplifier for outputting an (N)th gamma reference voltage lower than an (N−1)th gamma reference voltage to an (N)th output terminal. The (N)th operational amplifier can be, but is not limited to, the fifth operational amplifier AMP5 of FIG. 2.

The gamma reference voltage output circuit 300 includes a first register REG1, a second register REG2, a first DAC DAC1 connected between the first register REG1 and a first operational amplifier AMP1, a second DAC DAC2 connected between the second register REG2 and a fifth operational amplifier AMP5, and a voltage division circuit 20 connected between the output terminal of the first DAC DAC1 and the output terminal of the second DAC DAC2.

The first register REG1 receives first digital data set to a data value corresponding to the voltage level of the first gamma reference voltage GMA1, which is the highest gamma reference voltage, and stores the first digital data. The first DAC DAC1 converts the first digital data from the first register REG1 to an analog voltage and outputs the first gamma reference voltage GMA1.

The second register REG2 receives second digital data set to a data value corresponding to the voltage level of the fifth gamma reference voltage GMA5, which is the lowest gamma reference voltage, and stores the second digital data. The second DAC DAC2 converts the second digital data from the second register REG2 to an analog voltage and outputs the fifth gamma reference voltage GMA5.

The voltage division circuit can include a plurality of resistors R connected in series between the output terminals of the first DAC DAC1 and the output terminals of the second DAC DAC2. The voltage division circuit divides the first gamma reference voltage GMA1 using a resistor string to output second to fourth gamma reference voltages GMA2, GMA3, and GMA4 having voltage levels between the first gamma reference voltage GMA1 and the fifth gamma reference voltage GMA5. The second gamma reference voltage GMA2 is a voltage that is lower than the first gamma reference voltage GMA1 and higher than the third gamma reference voltage GMA3. The third gamma reference voltage GMA3 is a voltage that is lower than the second gamma reference voltage GMA2 and higher than the fourth gamma reference voltage GMA4. The fourth gamma reference voltage GMA4 is a voltage that is lower than the third gamma reference voltage GMA3 and higher than the fifth gamma reference voltage GMA5.

Each of the operational amplifiers AMP1 to AMP5 includes a non-inverting input terminal (+), an inverting input terminal (−), an output terminal, a driving voltage terminal (hereinafter referred to as a "SVDD terminal"), and a ground terminal GND. The operational amplifiers AMP1 to AMP5 are cascade-connected through connection nodes 21 to 24 that connect the output terminals and the driving voltage terminal SVDD. For example, a driving voltage of, but not limited to, 17 V can be applied to the SVDD terminal. A ground voltage GND applied to the ground terminal GND can be 0 volts.

A first connection node 21 connects a first output terminal OUT1 to the SVDD terminal of the second operational amplifier AMP2. A second connection node 22 connects a second output terminal OUT1 to the SVDD terminal of the third operational amplifier AMP3. The third connection node 23 connects a third output terminal OUT3 to the SVDD terminal of the fourth operational amplifier AMP4. The fourth connection node 24 connects a fourth output terminal OUT4 to the SVDD terminal of the fourth operational amplifier AMP4.

The first operational amplifier AMP1 includes a SVDD terminal to which the driving voltage is applied, a ground terminal GND to which the ground voltage is applied, a non-inverting input terminal (+) to which the first gamma reference voltage GMA1 is applied, a first output terminal OUT1 from which the first gamma reference voltage GMA1 is output, and an inverting input terminal (−) connected to the first output terminal OUT1 and the first connection node 21. The first operational amplifier AMP1 transmits the first gamma reference voltage GMA1 to the first output terminal OUT1, and at the same time, transmits the first gamma reference voltage GMA1 to the SVDD terminal of the second operational amplifier AMP2 through the first connection node 21.

The second operational amplifier AMP2 includes a SVDD terminal to which the first gamma reference voltage GMA1 is applied, a ground terminal GND to which the ground voltage is applied, a non-inverting input terminal (+) to which the second gamma reference voltage GMA2 is applied, a second output terminal OUT2 from which the second gamma reference voltage GMA2 is output, and an inverting input terminal (−) connected to the second output terminal OUT2 and the second connection node 22. The second operational amplifier AMP2 transmits the second gamma reference voltage GMA2 to the second output terminal OUT2, and at the same time, transmits the second gamma reference voltage GMA2 to the SVDD terminal of the third operational amplifier AMP3 through the second connection node 22.

The third operational amplifier AMP3 includes an SVDD terminal to which the second gamma reference voltage GMA2 is applied, a ground terminal GND to which the ground voltage is applied, a non-inverting input terminal (+) to which the third gamma reference voltage GMA3 is applied, a third output terminal OUT3 from which the third gamma reference voltage GMA3 is output, and an inverting input terminal (−) connected to the third output terminal OUT3 and the third connection node 23. The third operational amplifier AMP3 transmits the third gamma reference voltage GMA3 to the third output terminal OUT3, and at the same time, transmits the third gamma reference voltage GMA3 to the SVDD terminal of the fourth operational amplifier AMP4 through the third connection node 23.

The fourth operational amplifier AMP4 includes an SVDD terminal to which the third gamma reference voltage GMA3 is applied, a ground terminal GND to which the ground voltage is applied, a non-inverting input terminal (+) to which the fourth gamma reference voltage GMA4 is applied, a fourth output terminal OUT4 to which the fourth gamma reference voltage GMA4 is output, and an inverting input terminal (−) connected to the fourth output terminal OUT4 and the fourth connection node 24. The fourth operational amplifier AMP4 transmits the fourth gamma reference voltage GMA4 to the fourth output terminal OUT4, and at the same time, transmits the fourth gamma reference voltage GMA4 to the SVDD terminal of the fifth operational amplifier AMP5 through the fourth connection node 24.

The fifth operational amplifier AMP5 includes an SVDD terminal to which the fourth gamma reference voltage GMA4 is applied, a ground terminal GND to which the ground voltage is applied, a non-inverting input terminal (+) to which the fifth gamma reference voltage GMA5 is applied, a fifth output terminal OUT5 from which the fifth gamma reference voltage GMA5 is output, and an inverting input terminal (−) connected to the fifth output terminal OUT5. The fifth operational amplifier AMP5 transmits the fifth gamma reference voltage GMA5 to the fifth output terminal OUT5.

As shown in FIG. 3, an (x)th (x is a natural number) gamma reference voltage output from the output terminal of an (x)th operational amplifier must be less than the voltage input to the SVDD terminal of the (x)th operational amplifier through the connection nodes 21 to 24 to allow the (x)th operational amplifier to operate normally. For example, the driving voltage (e.g., 17 V) applied to the SVDD terminal of the first operational amplifier AMP1 is higher than the first gamma reference voltage (e.g., 16.2 V), which is the highest gamma reference voltage. The second gamma reference voltage (e.g., 12.2 V) is lower than the first gamma reference voltage (e.g., 16.2 V) applied to the SVDD terminal of the second operational amplifier AMP2. The third-gamma reference voltage (e.g., 8.2 V) is lower than the second-gamma reference voltage (e.g., 12.2 V) applied to the SVDD terminal of the third operational amplifier AMP3. The fourth-gamma reference voltage (e.g., 4.2 V) is lower than the third-gamma reference voltage (e.g., 8.2 V) applied to the SVDD terminal of the fourth operational amplifier AMP4. The fifth gamma reference voltage (e.g., 0.2 V), the lowest gamma reference voltage, is lower than the fourth gamma reference voltage (e.g., 4.2 V) applied to the SVDD terminal of the fifth operational amplifier AMP5.

Figure 4:
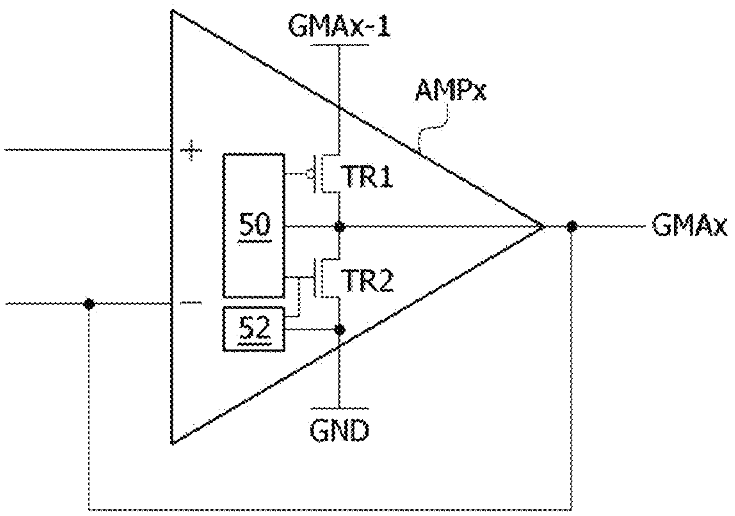
FIG. 4 is a circuit diagram illustrating the sensing circuit of the second to fifth operational amplifiers shown in FIG. 2.

The first operational amplifier AMP1 can include the sensing circuit as shown in FIG. 3. The second to fifth operational amplifiers AMP2 to AMP4 can include the sensing circuit as shown in FIG. 4.

Referring to FIG. 3, the first operational amplifier AMP1 includes a first transistor TR1 connected between the SVDD terminal and the output terminal, a second transistor TR2 connected between the output terminal and the ground terminal, a control part 40 for controlling gate voltages of the first and second transistors TR1 and TR2, a first sensing part 41 connected to the first transistor TR1 to sense a current flowing through the first transistor TR1, and a second sensing part 42 connected to the second transistor TR2 to sense a current flowing through the second transistor TR2. The first transistor TR1 can be implemented as a p-channel transistor, and the second transistor TR2 can be implemented as an n-channel transistor.

The first transistor TR1 of the first operational amplifier AMP1 is turned on in response to the gate voltage from the control part 40. When the first transistor TR1 is turned on, the SVDD terminal is electrically connected to the first output terminal, causing a sourcing current to flow toward the first output terminal. The first transistor TR1 includes a first electrode connected to the SVDD terminal, a gate electrode connected to a first control signal terminal of the control part 40, and a second electrode connected to the first output terminal.

The second transistor TR2 of the first operational amplifier AMP1 is turned on in response to the gate voltage from the control part 40. When the second transistor TR2 is turned on, the ground terminal GND is electrically connected to the first output terminal, causing a sinking current to flow toward the ground voltage. The second transistor TR2 includes a first electrode connected to the first output terminal, a gate electrode connected to a second control signal terminal of the control part 40, and a second electrode connected to the ground terminal GND to which the ground voltage is applied.

The control part 40 of the first operational amplifier AMP1 controls the gate voltages of the first and second transistors TR1 and TR2 through the first and second control signal terminals to output a target voltage for the first gamma reference voltage GMA1.

The first sensing part 41 of the first operational amplifier AMP1 senses the sourcing current flowing through the first output terminal and outputs an error signal ES as a specific logic value, for example, a high logic value (H=1) when the sourcing current is higher than a first threshold. The second sensing part 42 of the first operational amplifier AMP1 senses the sinking current flowing through the first output terminal and outputs an error signal ES as a certain logic value, for example, a high logic value (H=1) when the sinking current is higher than a second threshold.

In FIG. 4, the term "GMAx" denotes an (x)th gamma reference voltage output through the output terminal of an (x)th (where x is a natural number) operational amplifier AMPx, and the term "GMAx−1" denotes an (x−1)th gamma reference voltage applied to the SVDD terminal of the (x)th operational amplifier AMPx through the connection nodes 21 to 24.

Referring to FIG. 4, each of the second to fifth operational amplifiers AMP2 to AMP5 includes a first transistor TR1, a second transistor TR2 connected between the output terminal and the ground terminal GND, a control part 50 for controlling gate voltages of the first and second transistors TR1 and TR2, and a second sensing part 52 connected to the second transistor TR2 to sense a current flowing through the second transistor TR2. The first transistor TR1 can be implemented as a p-channel transistor, and the second transistor TR2 can be implemented as an n-channel transistor. A first sensing part can be omitted from each of the second to fifth operational amplifiers AMP2 to AMP5.

The first transistor TR1 of each of the second to fifth operational amplifiers AMP2 to AMP5 is turned on in response to the gate voltage from the control part 50. When the first transistor TR1 is turned on, the SVDD terminal is electrically connected to a corresponding output terminal, causing the sourcing current to flow toward the output terminal. The first transistor TR1 includes a first electrode connected to the SVDD terminal, a gate electrode connected to a first control signal terminal of the control part 50, and a second electrode connected to the output terminal.

The second transistor TR2 of each of the second to fifth operational amplifiers AMP2 to AMP5 is turned on in response to the gate voltage from the control part 50. When the second transistor TR2 is turned on, the ground terminal GND is electrically connected to a corresponding output terminal, causing the sinking current to flow toward the ground voltage. The second transistor TR2 includes a first electrode connected to the corresponding output terminal of each of the second to fifth operational amplifiers AMP2 to AMP5, a gate electrode connected to a second control signal terminal of the control part 50, and a second electrode connected to the ground terminal GND to which the ground voltage is applied.

The control part 50 of each of the second to fifth operational amplifiers AMP2 to AMP5 controls the gate voltages of the first and second transistors TR1 and TR2 through the first and second control signal terminals to output a target voltage for the corresponding gamma reference voltage GMA2 to GMA5.

The second sensing part 52 of each of the second to fifth operational amplifiers AMP2 to AMP5 senses the sinking current flowing through the corresponding output terminal and outputs the error signal ES as the specific logic value, for example, a high logic value (H=1) when the sinking current is higher than a second threshold.

The first and second thresholds for comparison with an abnormal output current in the operational amplifiers AMP1 to AMP5 can be set to different values depending to the voltage level of the gamma reference voltage.

Figure 5A:
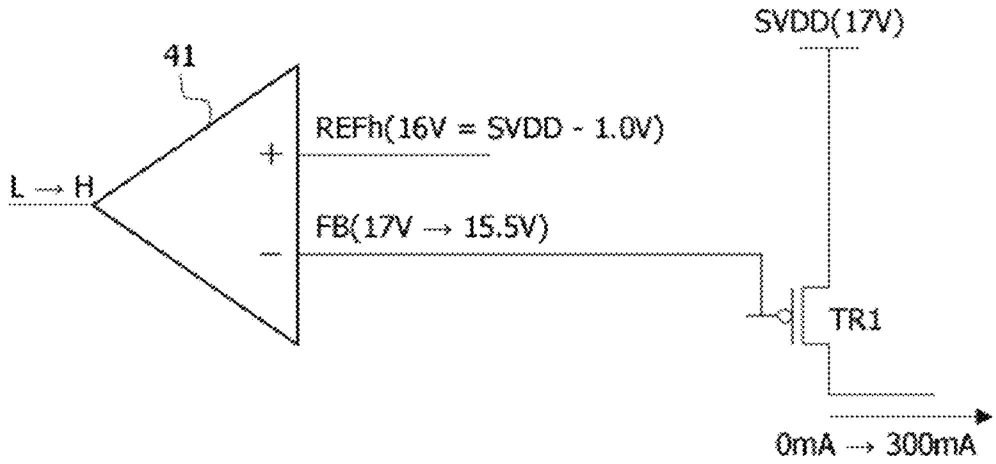
FIGS. 5A and 5B are circuit diagrams illustrating the first sensing part shown in FIG. 3 in detail.
Figure 5B:
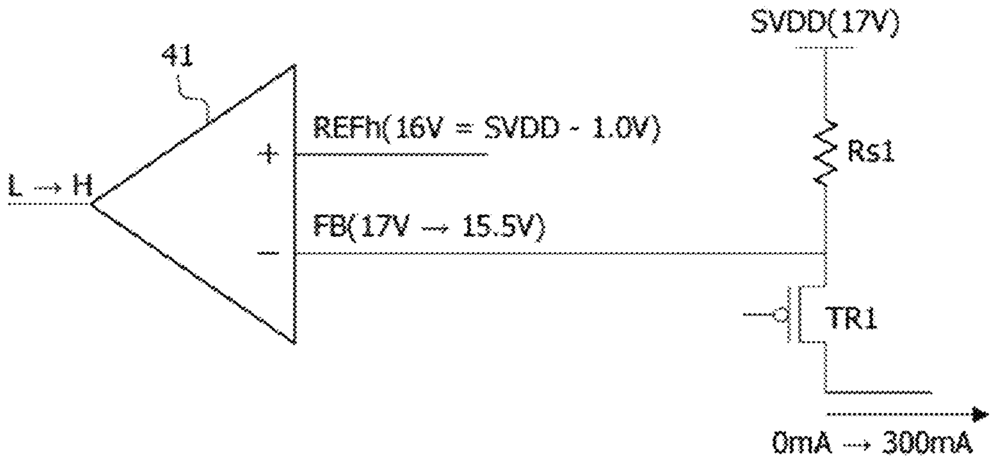

FIGS. 5A and 5B are circuit diagrams illustrating the first sensing part shown in FIG. 3 in detail. Particularly, FIGS. 5A and 5B illustrate, but are not limited to, an example in which when SVDD=17V and REFh=SVDD-1.0V=16V, the current flowing through the first transistor TR1 and the output terminal increases from 0 mA to 300 mA and the feedback signal FB decreases from 17V to 15.5V.

Referring to FIG. 5A, the first sensing part 41 includes a comparator connected to the gate electrode of the first transistor TR1. The comparator can be implemented as an operational amplifier. The operational amplifier used as the comparator includes a non-inverting input terminal (+) to which a reference voltage REFh set as the first threshold is applied, an inverting input terminal (−) connected to the gate electrode of the first transistor TR1 to which a feedback signal FB is applied, and an output terminal ES from which an error signal ES is output.

The output terminals of the gamma reference voltage output circuit 300 are electrically connected through the connection nodes 21 to 24 and the first transistors TR1 that are turned on. Therefore, when the current is increased at any of the output terminals of the gamma reference voltage output circuit 300, the control part 40 lowers the gate voltage of the first transistor TR1 to increase the gate-source voltage Vgs of the first transistor TR1. In this case, since the feedback signal FB, which is the gate voltage of the first transistor TR1, becomes lower than the reference voltage REFh, the comparator of the first sensing part 41 can output the error signal ES of the certain logic value, for example, the high logic value H.

Referring to FIG. 5B, the first sensing part 41 includes a sensing resistor Rs1 connected between the SVDD terminal and the first transistor TR1, and a comparator connected to a node between the sensing resistor Rs1 and the first electrode of the first transistor TR1. The comparator includes a non-inverting input terminal (+) to which the reference voltage REFh set as a first threshold is applied, an inverting input terminal (−) connected to the first electrode of the first transistor TR1 and the sensing resistor Rs1 to which the feedback signal FB is applied, and the output terminal ES from which the error signal ES is output.

When the current is increased in any of the output terminals of the gamma reference voltage output circuit 300, the voltage difference across the sensing resistor Rs1 increases, and the voltage of the feedback signal FB decreases. In this case, since the voltage of the feedback signal FB becomes lower than the reference voltage REFh, the comparator of the first sensing part 41 can output the error signal ES of the certain logic value, for example, the high logic value (H).

Figure 6A:
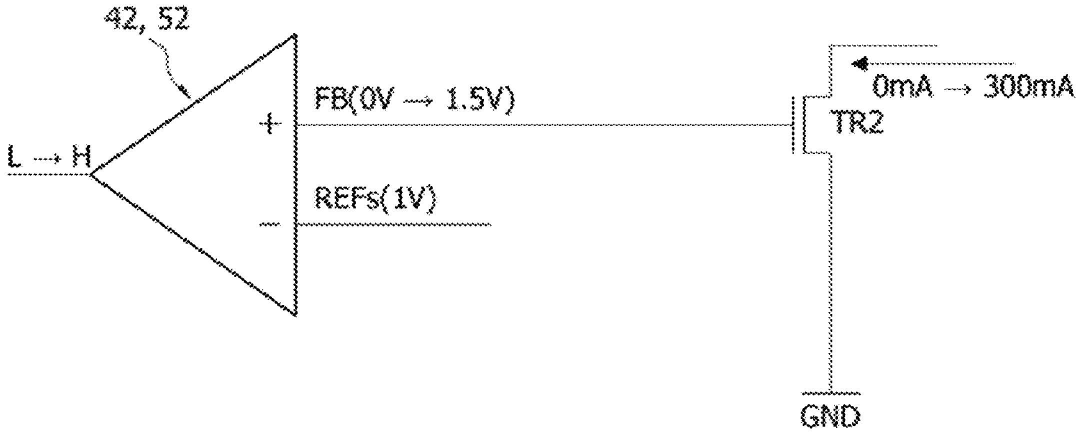
FIGS. 6A and 6B are circuit diagrams illustrating the second sensing part shown in FIG. 4 in detail.
Figure 6B:
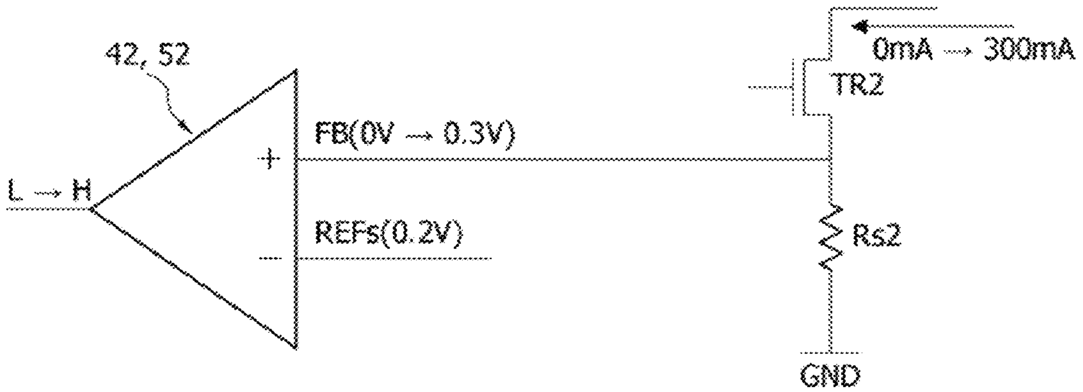

FIGS. 6A and 6B are circuit diagrams illustrating the second sensing part shown in FIG. 4 in detail. Particularly, FIG. 6A shows an example in which when REFs=1V, the current flowing through the output terminal and the second transistor TR2 increases from 0 mA to 300 mA and the feedback signal FB increases from 0V to 1.5V, but is not limited to this. FIG. 6B shows an example in which when REFs=0.2V, the current flowing through the output terminal and the second transistor TR2 increases from 0 mA to 300 mA and the feedback signal FB increases from 0V to 0.3V, but is not limited to this.

Referring to FIG. 6A, the second sensing part 42, 52 include a comparator connected to the gate electrode of the second transistor TR2. The comparator includes an inverting input terminal (−) to which the reference voltage REFs set as the second threshold are applied, a non-inverting input terminal (+) connected to the gate electrode of the second transistor TR2 to which the feedback signal FB is applied, and an output terminal (+) from which the error signal ES is output.

When the current flowing through the output terminal of the gamma reference voltage output circuit 300 increases, resulting in an overcurrent higher than the second threshold, the control part 40 increases the gate voltage of the second transistor TR2 to increase the gate-to-source voltage Vgs of the second transistor TR2. In this case, since the feedback signal FB, which is the gate voltage of the second transistor TR2, is higher than the reference voltage REFs, the comparator of the second sensing part 42, 52 can output the error signal ES of the certain logic value, for example, the high logic value H.

Referring to FIG. 6B, the second sensing part 42, 52 includes a sensing resistor Rs connected between the ground terminal GND and the second transistor TR2, and a comparator connected between the sensing resistor Rs2 and the second electrode of the second transistor TR2. The comparator includes an inverting input terminal (−) to which a reference voltage REFs set as the second threshold is applied, a non-inverting input terminal (+) connected to a node between the second electrode of the second transistor TR2 and a sensing resistor Rs to which the feedback signal FB is applied, and an output terminal ES from which the error signal ES is output.

When the overcurrent flows through the output terminal, the voltage difference across the sensing resistor Rs1 increases and the voltage of the feedback signal FB increases. In this case, since the voltage of the feedback signal FB is higher than the reference voltage REFh, the comparator of the second sensing part 42, 52 can output the error signal ES of the certain logic value, for example, the high logic value H.

Figure 7:
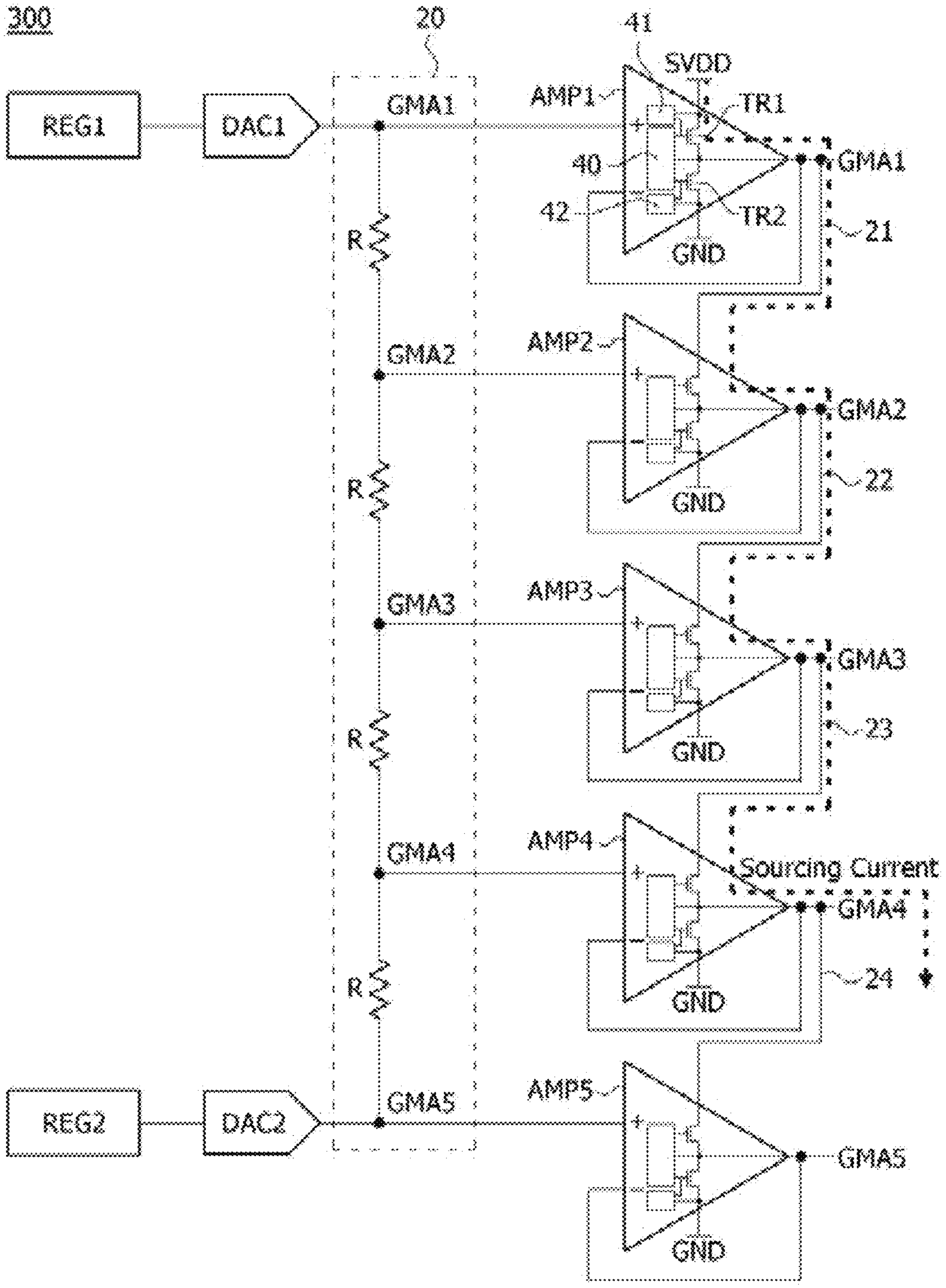
FIGS. 7 and 8 are circuit diagrams illustrating the operation of a gamma reference voltage output circuit according to the first embodiment of the present disclosure.
Figure 8:
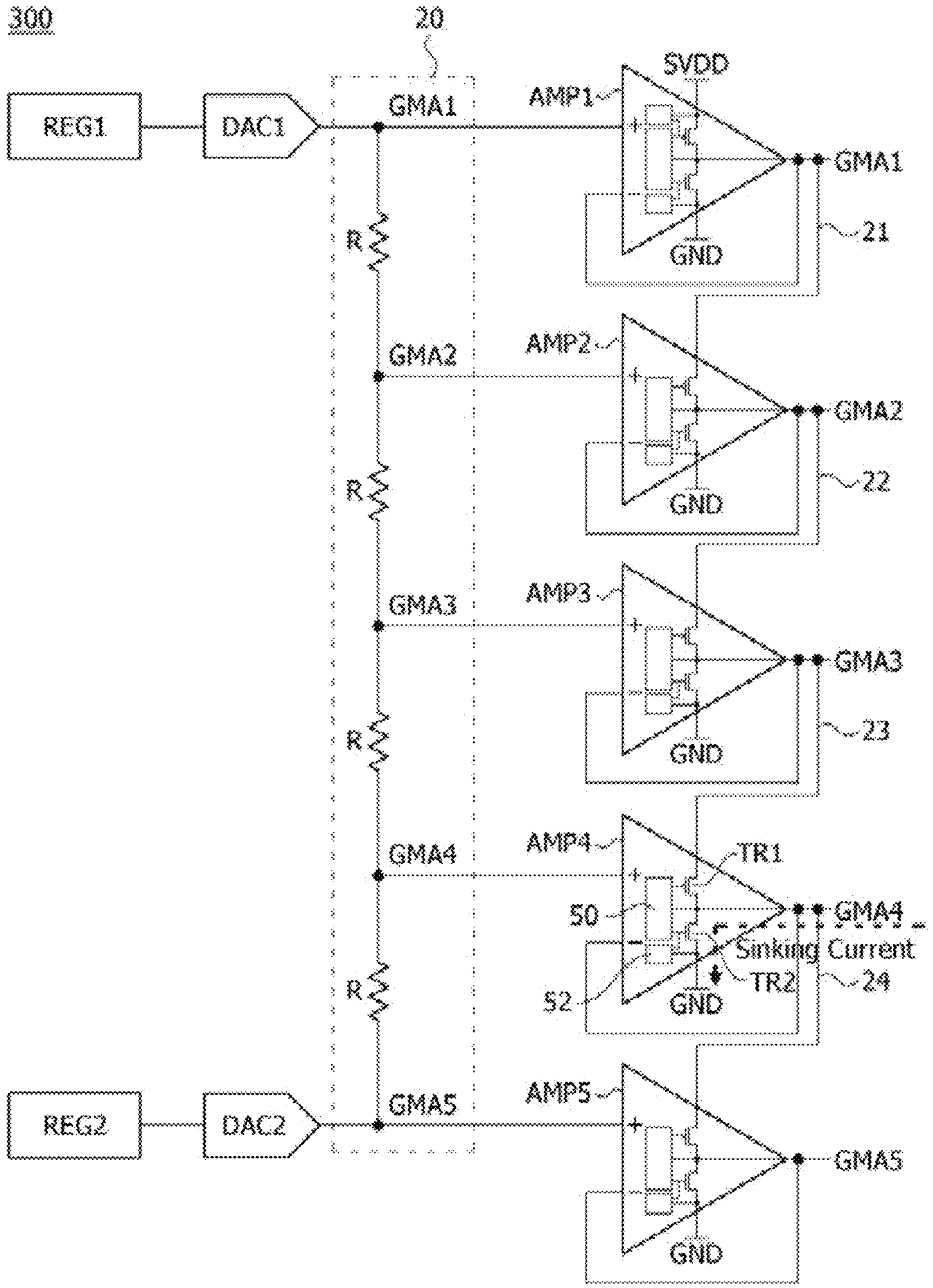

FIGS. 7 and 8 are circuit diagrams illustrating the operation of a gamma reference voltage output circuit according to a first embodiment of the present disclosure.

As illustrated in FIG. 7, the fourth gamma reference voltage GMA4 output from the fourth operational amplifier AMP4 can be short-circuited to a lower voltage, resulting in the sourcing current. In this case, the sourcing current is sensed by the first sensing part 41 of the first operational amplifier AMP1 since the first sensing part 41 of the first operational amplifier AMP1 is connected to the output terminal of the fourth operational amplifier AMP4 through the first transistor TR1 and the connection nodes 21 to 24. When the sourcing current is greater than the first threshold, the first sensing part 41 outputs the error signal ES of the certain logic value.

As shown in FIG. 8, the fourth gamma reference voltage GMA4 output from the fourth operational amplifier AMP4 can be short-circuited to a higher voltage, resulting in the sinking current. In this case, the sinking current is sensed by the second sensing part 52 of the fourth operational amplifier AMP4. When the sinking current is greater than the second threshold, the second sensing part 52 outputs the error signal ES of the certain logical value.

Figure 9:
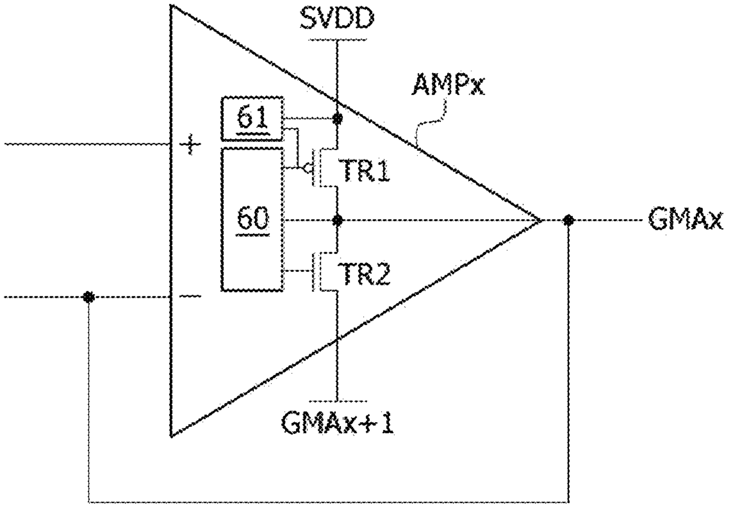
FIGS. 9 to 12 are circuit diagrams illustrating a gamma reference voltage output circuit according to a second embodiment of the present disclosure.
Figure 10:
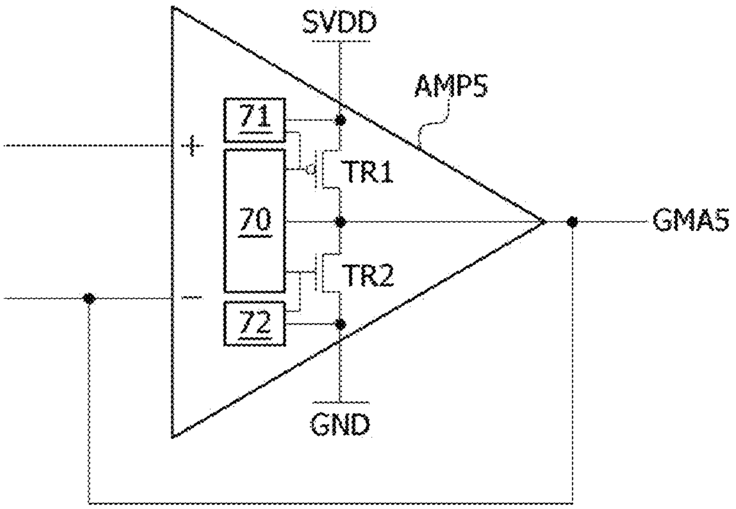

FIGS. 9 to 12 are circuit diagrams illustrating a gamma reference voltage output circuit according to a second embodiment of the present disclosure. In the second embodiment, the first to fourth operational amplifiers AMP1 to AMP4 can include the sensing circuit as shown in FIG. 9. The fifth operational amplifier AMP5 can include the sensing circuit as shown in FIG. 10.

Referring to FIG. 9, the (x)th operational amplifier AMPx includes a first transistor TR1 connected between the SVDD terminal and the (x)th output terminal, a second transistor TR2 connected between the (x)th output terminal and the (x+1)th output terminal, a control part 60 for controlling the gate voltages of the first and second transistors TR1 and TR2, and a first sensing part 61 connected to the first transistor TR1 to sense the current flowing through the first transistor TR1. The first transistor TR1 can be implemented as a p-channel transistor, and the second transistor TR2 can be implemented as an n-channel transistor. A second sensing part can be omitted in each of the first through fourth operational amplifiers AMP1 to AMP4.

The first transistor TR1 of the (x)th operational amplifier AMPx is turned on in response to the gate voltage from the control part 60. When the first transistor TR1 is turned on, the SVDD terminal is electrically connected to the first output terminal, causing the sourcing current to flow toward the first output terminal. The first transistor TR1 includes a first electrode connected to the SVDD terminal, a gate electrode connected to a first control signal terminal of the control part 60, and a second electrode connected to the (x)th output terminal from which the (x)th gamma reference voltage GMAx is output.

The second transistor TR2 of the (x)th operational amplifier AMPx is turned on in response to the gate voltage from the control part 60. When the second transistor TR2 is turned on, the (x+1)th gamma reference voltage GMAx+1 output from the (x+1)th operational amplifier is electrically connected to the (x)th output terminal, causing the sinking current to flow toward the (x+1)th gamma reference voltage GMAx+1. The second transistor TR2 includes a first electrode connected to the (x)th output terminal, a gate electrode connected to a second control signal terminal of the control part 60, and a second electrode to which the (x+1)th gamma reference voltage GMAx+1 is applied.

The control part 60 controls the gate voltages of the first and second transistors TR1 and TR2 through the first and second control signal terminals to output the target voltage for the (x)th gamma reference voltage GMAX.

The first sensing part 61 of the first operational amplifier AMPx senses the sourcing current and outputs the error signal ES as the specific logic value, for example, the high logic value (H=1) when the sourcing current is higher than the first threshold.

Referring to FIG. 10, the fifth operational amplifier AMP5 includes a first transistor TR1, a second transistor TR2 connected between a fifth output terminal and a ground terminal GND, a control part 70 for controlling the gate voltages of the first and second transistors TR1 and TR2, a first sensing part 71 connected to the first transistor TR1, and a second sensing part 72 connected to the second transistor TR2. The first transistor TR1 can be implemented as a p-channel transistor, and the second transistor TR2 can be implemented as an n-channel transistor.

The first transistor TR1 of the fifth operational amplifier AMP5 is turned on in response to the gate voltage from the control part 70. When the first transistor TR1 is turned on, the SVDD terminal is electrically connected to the fifth output terminal, causing the sourcing current to flow toward the fifth output terminal. The first transistor TR1 includes a first electrode connected to the SVDD terminal, a gate electrode connected to a first control signal terminal of the control part 70, and a second electrode connected to the fifth output terminal.

The second transistor TR2 of the fifth operational amplifier AMP5 is turned on in response to the gate voltage from the control part 70. When the second transistor TR2 is turned on, the ground terminal GND is electrically connected to the fifth output terminal, causing the sinking current to flow toward the ground voltage. The second transistor TR2 includes a first electrode connected to the fifth output terminal, a gate electrode connected to a second control signal terminal of the control part 70, and a second electrode connected to the ground terminal GND.

The control part 70 controls the gate voltages of the first and second transistors TR1 and TR2 through the first and second control signal terminals to output the target voltage for the fifth gamma reference voltage GMA5.

The first sensing part 71 of the fifth operational amplifier AMP5 senses the sourcing current and outputs the error signal ES of the certain logic value when the sourcing current is higher than the first threshold. The second sensing part 72 of the fifth operational amplifier AMP5 senses the sinking current and outputs the error signal ES of the certain logic value when the sinking current is higher than the second threshold.

Figure 11:
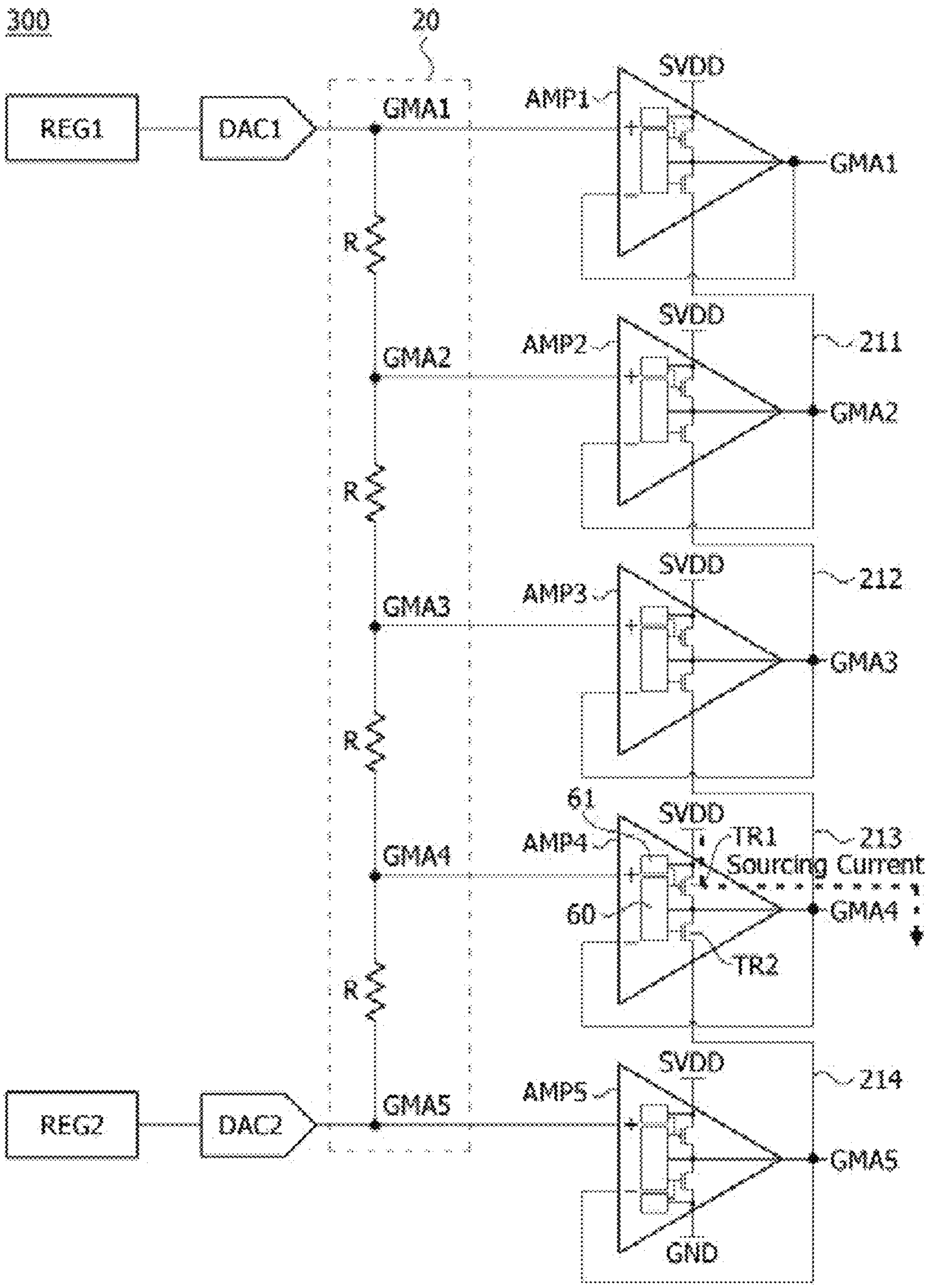
Figure 12:
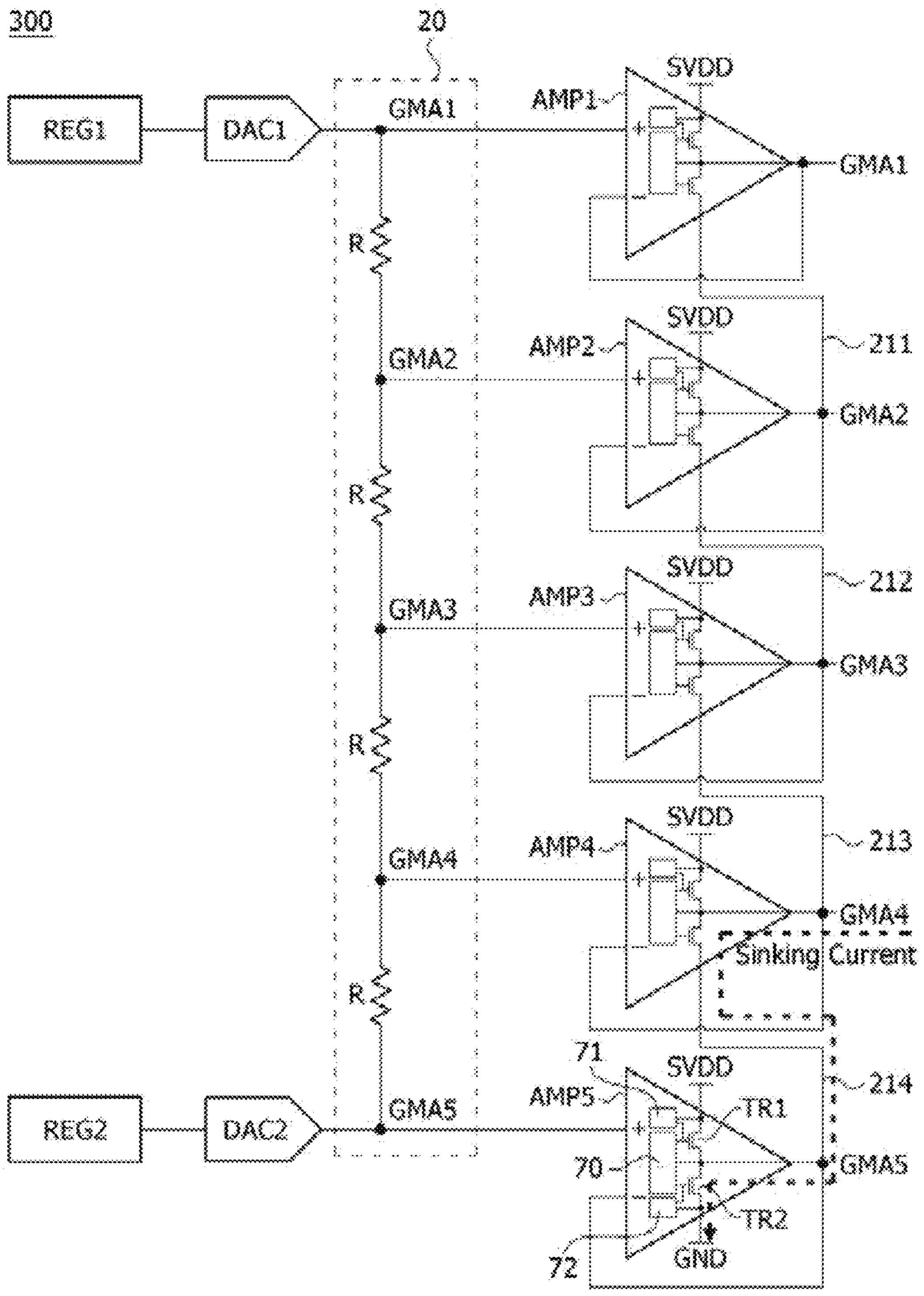

Referring to FIGS. 11 and 12, the operational amplifiers AMP1 to AMP5 are cascade-connected through connection nodes 211 to 214 that connect the ground terminal of the (x−1)th operational amplifier to the output terminal of the (x)th operational amplifier. For example, the ground terminal of the first operational amplifier AMP1 is connected to the second output terminal from which the second gamma reference voltage GMA2 is output through a first connection node 211. The ground terminal of the second operational amplifier AMP2 is connected to the third output terminal from which the third gamma reference voltage GMA3 is output through a second connection node 212.

The first operational amplifier AMP1 includes an SVDD terminal to which the driving voltage is applied, a ground terminal to which the second gamma reference voltage GMA2 that is output from the second operational amplifier AMP2 is applied through the first connection node 211, a non-inverting input terminal (+) to which the first gamma reference voltage GMA1 is applied, a first output terminal from which the first gamma reference voltage GMA1 is output, and an inverting input terminal (−) connected to the first output terminal. The first operational amplifier AMP1 transmits the first gamma reference voltage GMA1 to the first output terminal. The first connection node 211 connects the ground terminal of the first operational amplifier AMP1 to the second output terminal.

The second operational amplifier AMP2 includes an SVDD terminal to which the driving voltage is applied, a ground terminal to which the third gamma reference voltage GMA3 output from the third operational amplifier AMP3 through the second connection node 212 is applied, a non-inverting input terminal (+) to which the second gamma reference voltage GMA2 is applied, a second output terminal from which the second gamma reference voltage GMA2 is output, and an inverting input terminal (−) connected to the second output terminal. The second operational amplifier AMP2 transmits the second gamma reference voltage GMA2 to the second output terminal. The second connection node 212 connects the ground terminal of the second operational amplifier AMP2 to the third output terminal.

The third operational amplifier AMP3 includes an SVDD terminal to which the driving voltage is applied, a ground terminal to which the fourth gamma reference voltage GMA4 output from the fourth operational amplifier AMP4 through a third connection node 213 is applied, a non-inverting input terminal (+) to which the third gamma reference voltage GMA3 is applied, the third output terminal from which the third gamma reference voltage GMA3 is output, and an inverting input terminal (−) connected to the third output terminal. The third operational amplifier AMP3 transmits the third gamma reference voltage GMA3 to the third output terminal. The third connection node 213 connects the ground terminal of the third operational amplifier AMP3 to the fourth output terminal.

The fourth operational amplifier AMP4 includes an SVDD terminal to which the driving voltage is applied, a ground terminal to which the fifth gamma reference voltage GMA5 output from the fifth operational amplifier AMP5 through a fourth connection node 214 is applied, a non-inverting input terminal (+) to which the fourth gamma reference voltage GMA4 is applied, the fourth output terminal from which the fourth gamma reference voltage GMA4 is output, and an inverting input terminal (−) connected to the fourth output terminal. The fourth operational amplifier AMP4 transmits the fourth gamma reference voltage GMA4 to the fourth output terminal. The fourth connection node 214 connects the ground terminal of the fourth operational amplifier AMP4 to the fifth output terminal.

The fifth operational amplifier AMP5 includes an SVDD terminal to which the driving voltage is applied, a ground terminal to which the ground voltage is applied, a non-inverting input terminal (+) to which the fifth gamma reference voltage GMA5 is applied, the fifth output terminal from which the fifth gamma reference voltage GMA5 is output, and an inverting input terminal (−) connected to the fifth output terminal. The fifth operational amplifier AMP5 transmits the fifth gamma reference voltage GMA5 to the fifth output terminal.

As illustrated in FIG. 11, the fourth gamma reference voltage GMA4 output from the fourth operational amplifier AMP4 can be short-circuited to a lower voltage, resulting in the sourcing current. In this case, the first sensing part 61 of the fourth operational amplifier AMP1 senses the sourcing current flowing through the first transistor TR1 and the fourth output terminal. When the sourcing current is greater than the first threshold, the first sensing part 61 outputs the error signal ES of the certain logic value.

As shown in FIG. 12, the fourth gamma reference voltage GMA4 output from the fourth operational amplifier AMP4 can be short-circuited to a higher voltage, resulting in the sinking current. In this case, the second sensing part 72 of the fifth operational amplifier AMP5 senses the sinking current flowing through the fourth output terminal since the second sensing part 72 of the fifth operational amplifier AMP2 is connected to the fourth output terminal through the second transistor TR2 and the fourth connection node 214. When the sinking current is greater than the second threshold, the second sensing part 72 outputs the error signal ES of the certain logical value.

Figure 13:
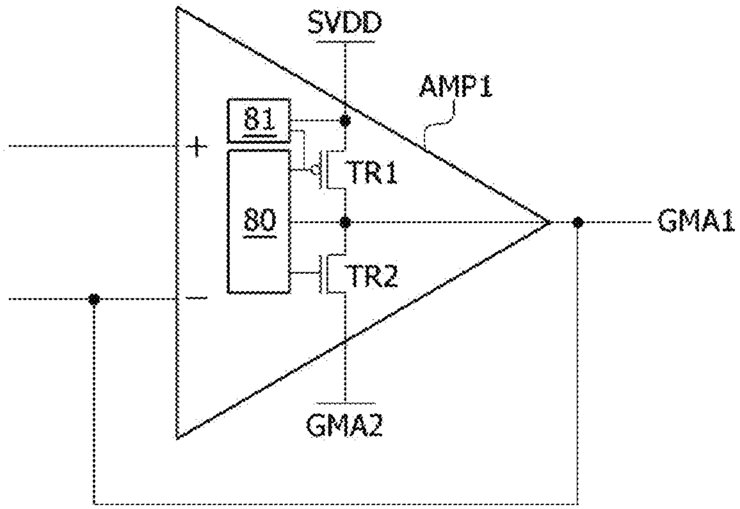
FIGS. 13 to 17 are circuit diagrams illustrating a gamma reference voltage output circuit according to a third embodiment of the present disclosure.
Figure 14:
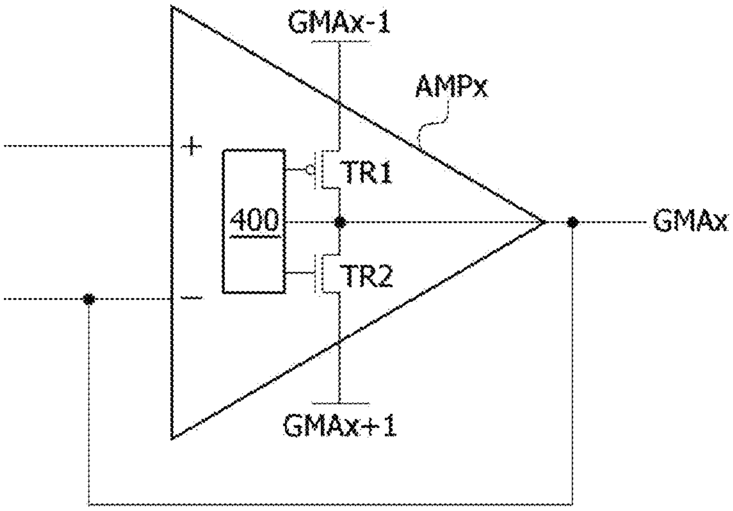
Figure 15:
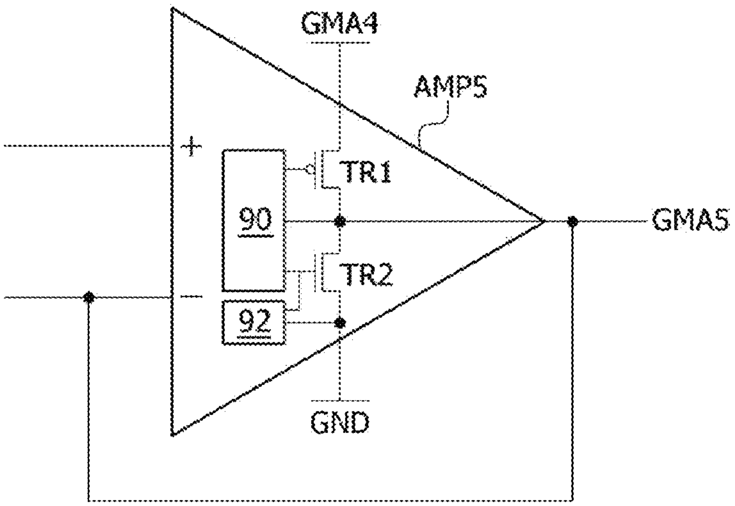

FIGS. 13 to 17 are circuit diagrams illustrating a gamma reference voltage output circuit according to a third embodiment of the present disclosure. In the third embodiment, the first operational amplifier AMP1 can include the sensing circuit as shown in FIG. 13. As shown in FIG. 14, the second to fourth operational amplifiers AMP2 to AMP4 can be operational amplifiers without the sensing circuit. The fifth operational amplifier AMP5 can include the sensing circuit as shown in FIG. 15.

Referring to FIG. 13, the first operational amplifier AMP1 includes a first transistor TR1 connected between the SVDD terminal and the first output terminal, a second transistor TR2 connected between the first output terminal and the second output terminal, a control part 80 for controlling the gate voltage of each of the transistors TR1 and TR2, and a first sensing part 81 connected to the first transistor TR1. The first transistor TR1 can be implemented as a p-channel transistor, and the second transistor TR2 can be implemented as an n-channel transistor. A second sensing part can be omitted in each of the first to fourth operational amplifiers AMP1 to AMP4.

The first transistor TR1 of the first operational amplifier AMP1 is turned on in response to the gate voltage from the control part 80. When the first transistor TR1 is turned on, the SVDD terminal is electrically connected to the first output terminal, causing the sourcing current to flow toward the first output terminal. The first transistor TR1 includes a first electrode connected to the SVDD terminal, a gate electrode connected to a first control signal terminal of the control part 80, and a second electrode connected to the first output terminal from which the first gamma reference voltage GMA1 is output.

The second transistor TR2 of the first operational amplifier AMP1 is turned on in response to the gate voltage from the control part 80. When the second transistor TR2 is turned on, the second gamma reference voltage GMA2 output from the second operational amplifier AMP2 is electrically connected to the first output terminal, causing the sinking current to flow toward the second gamma reference voltage GMA2. The second transistor TR2 includes a first electrode connected to the first output terminal, a gate electrode connected to a second control signal terminal of the control part 80, and a second electrode to which the second gamma reference voltage GMA2 is applied.

The control part 80 controls the gate voltages of the first and second transistors TR1 and TR2 through the first and second control signal terminals to output the target voltage for the first gamma reference voltage GMA1.

The first sensing part 81 of the first operational amplifier AMP1 senses the sourcing current and outputs the error signal ES as the specific logic value, for example, the high logic value (H=1) when the sourcing current is higher than the first threshold.

Referring to FIG. 14, the (x)th operational amplifier AMPx includes an SVDD terminal connected to the (x−1)th output terminal, a ground terminal connected to the (x+1)th output terminal, a first transistor TR1 connected between the SVDD terminal and the (x)th output terminal, a second transistor TR2 connected between the (x)th output terminal and the (x+1) output terminal, and a control part 400 for controlling the gate voltage of each of the transistors TR1 and TR2. The first transistor TR1 can be implemented as a p-channel transistor, and the second transistor TR2 can be implemented as an n-channel transistor.

The first transistor TR1 of the (x)th operational amplifier AMPx is turned on in response to the gate voltage from the control part 400. When the first transistor TR1 is turned on, the SVDD terminal is electrically connected to the (x)th output terminal, causing the sourcing current to flow toward the (x)th output terminal. The first transistor TR1 includes a first electrode connected to the SVDD terminal, a gate electrode connected to a first control signal terminal of the control part 400, and a second electrode connected to the (x)th output terminal from which the (x)th gamma reference voltage GMAx is output.

The second transistor TR2 of the (x)th operational amplifier AMPx is turned on in response to the gate voltage from the control part 400. When the second transistor TR2 is turned on, the (x+1)th gamma reference voltage GMAx+1 output from the (x+1)th operational amplifier is electrically connected to the (x)th output terminal, causing the sinking current to flow toward the (x+1)th gamma reference voltage GMAx+1. The second transistor TR2 includes a first electrode connected to the (x)th output terminal, a gate electrode connected to a second control signal terminal of the control part 400, and a second electrode to which the (x+1)th gamma reference voltage GMAx+1 is applied.

The control part 400 controls the gate voltages of the first and second transistors TR1 and TR2 through the first and second control signal terminals to output the target voltage for the (x)th gamma reference voltage GMAX.

Referring to FIG. 15, the fifth operational amplifier AMP5 includes an SVDD terminal connected to the fourth output terminal, a ground terminal GND to which a ground voltage is applied, a first transistor TR1 connected between the SVDD terminal and the fifth output terminal, a second transistor TR2 connected between the fifth output terminal and the ground terminal GND, a control part 90 for controlling the gate voltage of each of the transistors TR1 and TR2, and a second sensing part 92 connected to the second transistor TR2. The first transistor TR1 can be implemented as a p-channel transistor, and the second transistor TR2 can be implemented as an n-channel transistor. A first sensing part can be omitted in the fifth operational amplifier AMP5.

The first transistor TR1 of the fifth operational amplifier AMP5 is turned on in response to the gate voltage from the control part 90. When the first transistor TR1 is turned on, the SVDD terminal is electrically connected to the fifth output terminal, causing the sourcing current to flow toward the fifth output terminal. The first transistor TR1 includes a first electrode connected to the SVDD terminal, a gate electrode connected to a first control signal terminal of the control part 90, and a second electrode connected to the fifth output terminal.

The second transistor TR2 of the fifth operational amplifier AMP5 is turned on in response to the gate voltage from the control part 90. When the second transistor TR2 is turned on, the ground terminal GND is electrically connected to the fifth output terminal, causing the sinking current to flow toward the ground voltage. The second transistor TR2 includes a first electrode connected to the fifth output terminal, a gate electrode connected to a second control signal terminal of the control part 90, and a second electrode connected to the ground terminal GND.

The control part 90 controls the gate voltages of the first and second transistors TR1 and TR2 through the first and second control signal terminals to output the target voltage for the fifth gamma reference voltage GMA5.

The second sensing part 92 of the fifth operational amplifier AMP5 senses the sinking current and outputs the error signal ES of the certain logic value when the sinking current is higher than the second threshold.

Figure 16:
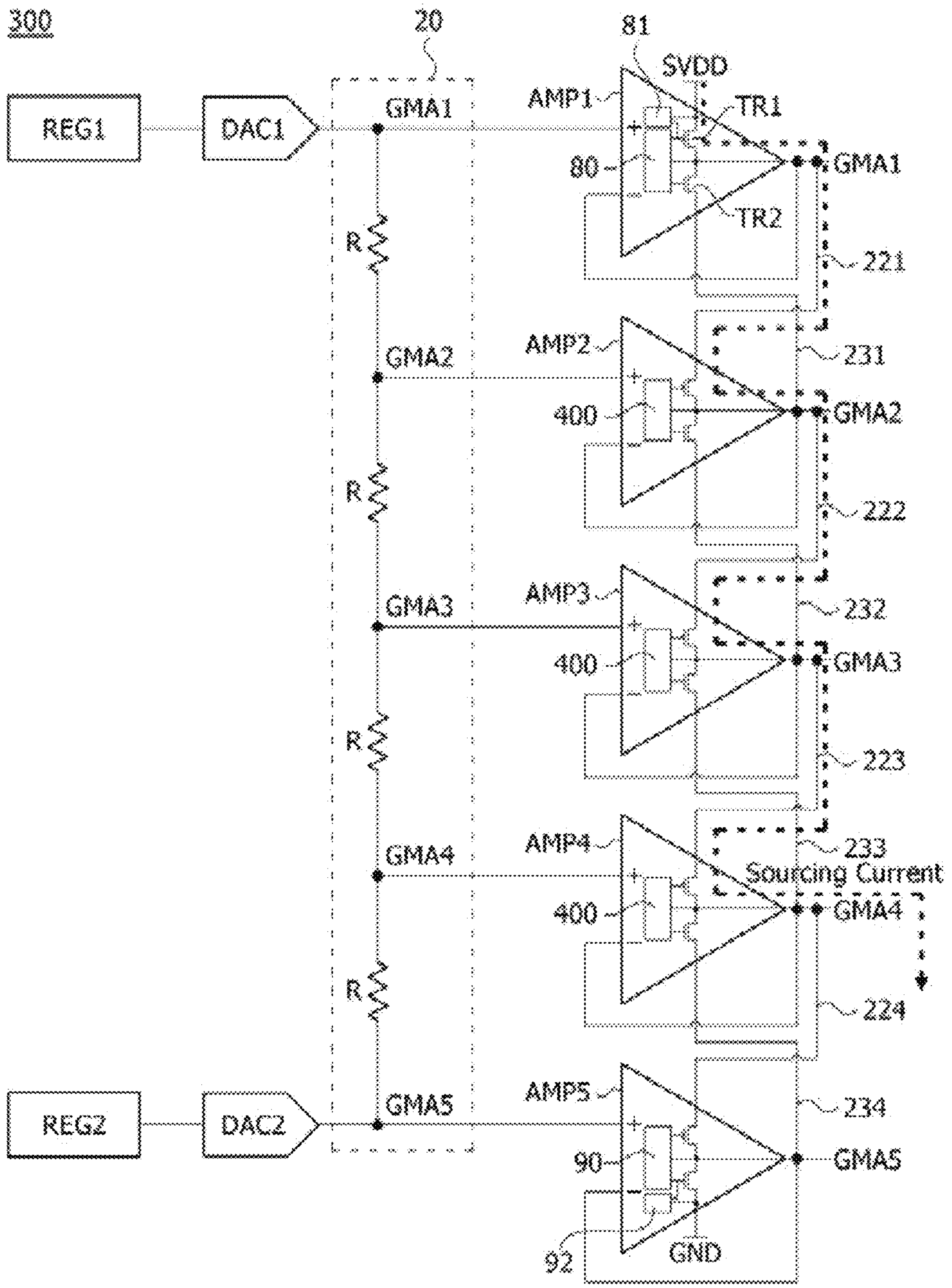
Figure 17:
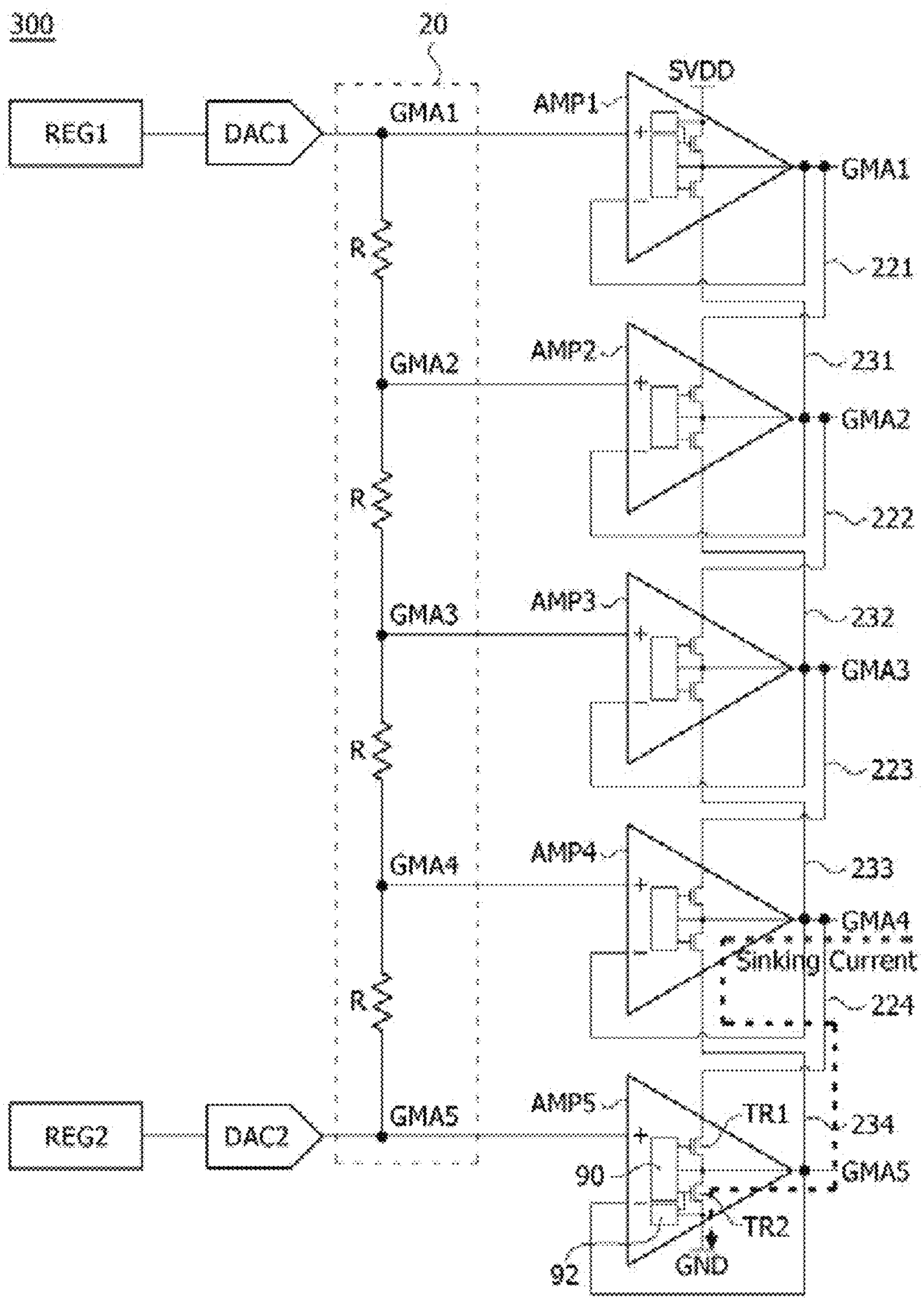

Referring to FIGS. 16 and 17, the operational amplifiers AMP1 to AMP5 are cascade-connected through first connection nodes 221 to 224 connecting the output terminal of the (x−1)th operational amplifier to the SVDD terminal of the (x)th operational amplifier, and second connection nodes 231 to 234 connecting the ground terminal of the (x−1)th operational amplifier to the output terminal of the (x)th operational amplifier. For example, the first output terminal from which the first gamma reference voltage GMA1 is output is connected to the SVDD terminal of the second operational amplifier AMP2 through a first-first connection node 221. The ground terminal of the first operational amplifier AMP1 is connected to the second output terminal from which the second gamma reference voltage GMA2 is output through a second-first connection node 231. The second output terminal is connected to the SVDD terminal of the third operational amplifier AMP3 through a first-second connection node 222. The ground terminal of the second operational amplifier AMP2 is connected to the third output terminal from which the third gamma reference voltage GMA3 is output through a second-second connection node 232.

The first-first connection node 221 connects the first output terminal to the SVDD terminal of the second operational amplifier AMP2. The second-first connection node 231 connects the ground terminal of the first operational amplifier AMP1 to the second output terminal from which the second gamma reference voltage GMA2 is output. The first-second connection node 222 connects the second output terminal to the SVDD terminal of the third operational amplifier AMP3. The second-second connection node 232 connects the ground terminal of the second operational amplifier AMP2 to the third output terminal from which the third gamma reference voltage GMA3 is output. A first-third connection node 223 connects the third output terminal to the SVDD terminal of the fourth operational amplifier AMP4. A second-third connection node 233 connects the ground terminal of the third operational amplifier AMP3 to the fourth output terminal from which the fourth gamma reference voltage GMA4 is output. A first-fourth connection node 224 connects the fourth output terminal to the SVDD terminal of the fifth operational amplifier AMP5. A second-fourth connection node 234 connects the ground terminal of the fourth operational amplifier AMP4 to the fifth output terminal from which the fifth gamma reference voltage GMA5 is output.

As illustrated in FIG. 16, the fourth gamma reference voltage GMA4 output from the fourth operational amplifier AMP4 can be short-circuited to a lower voltage, resulting in the sourcing current. In this case, the first sensing part 81 of the first operational amplifier AMP1 senses the sourcing current flowing through the fourth output terminal since the first sensing part 81 is connected to the fourth output terminal through the first transistor TR1 and the first connection nodes 221 to 223. When the sourcing current is greater than the first threshold, the first sensing part 81 outputs the error signal ES of the certain logic value.

As shown in FIG. 17, the fourth gamma reference voltage GMA4 output from the fourth operational amplifier AMP4 can be short-circuited to a higher voltage, resulting in the sinking current. In this case, the second sensing part 92 of the fifth operational amplifier AMP5 senses the sinking current flowing through the fourth output terminal since the second sensing part 92 of the fifth operational amplifier AMP2 is connected to the fourth output terminal through the second transistor TR2 and the second-fourth connection node 234. When the sinking current is greater than the second threshold, the second sensing part 92 outputs the error signal ES of the certain logical value.

FIGS. 18 to 23 are circuit diagrams illustrating a gamma reference voltage output circuit according to a fourth embodiment of the present disclosure.

Figure 18:
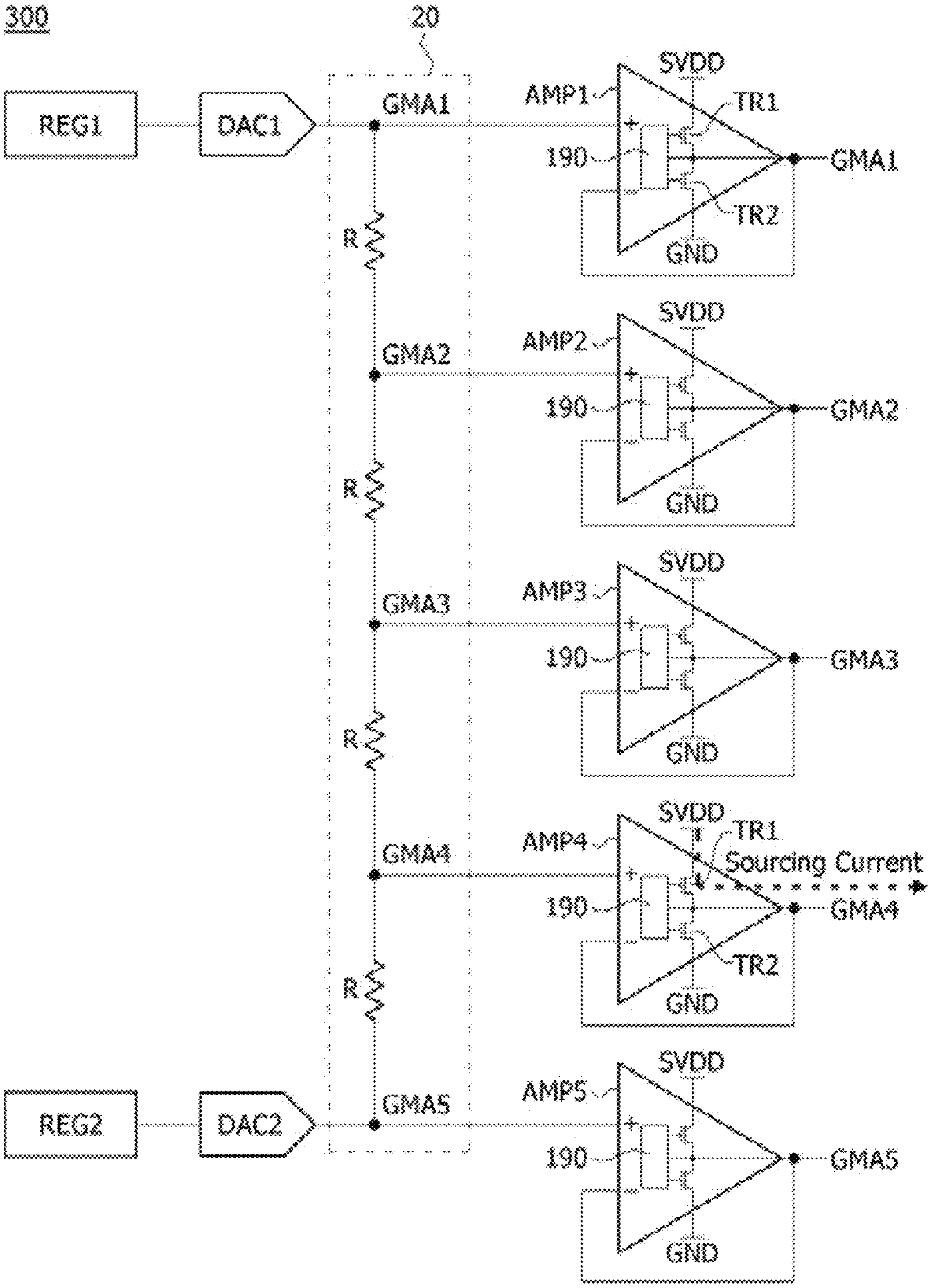
FIGS. 18 to 23 are circuit diagrams illustrating a gamma reference voltage output circuit according to a fourth embodiment of the present disclosure.
Figure 20:
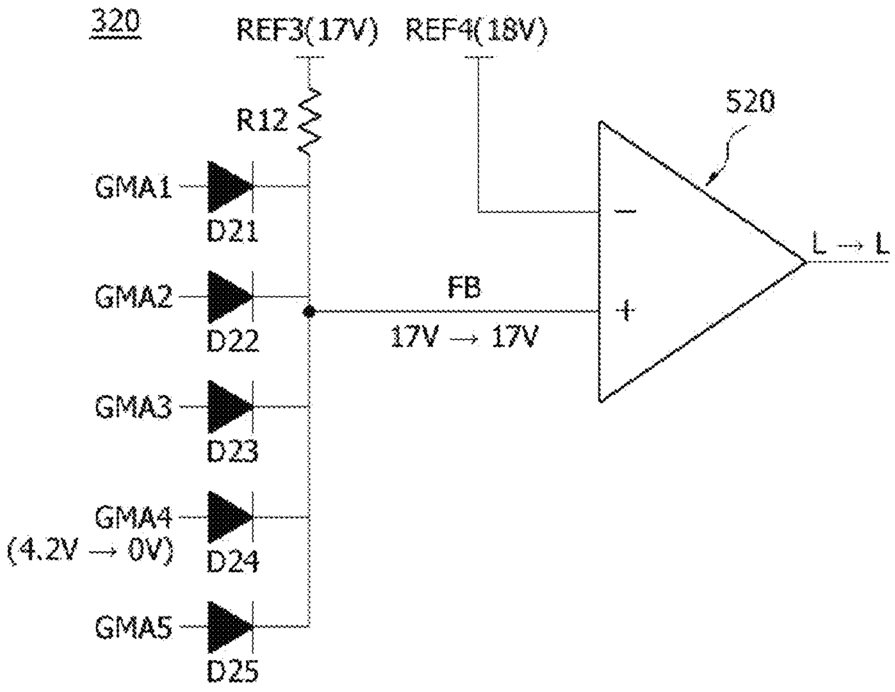
Figure 21:
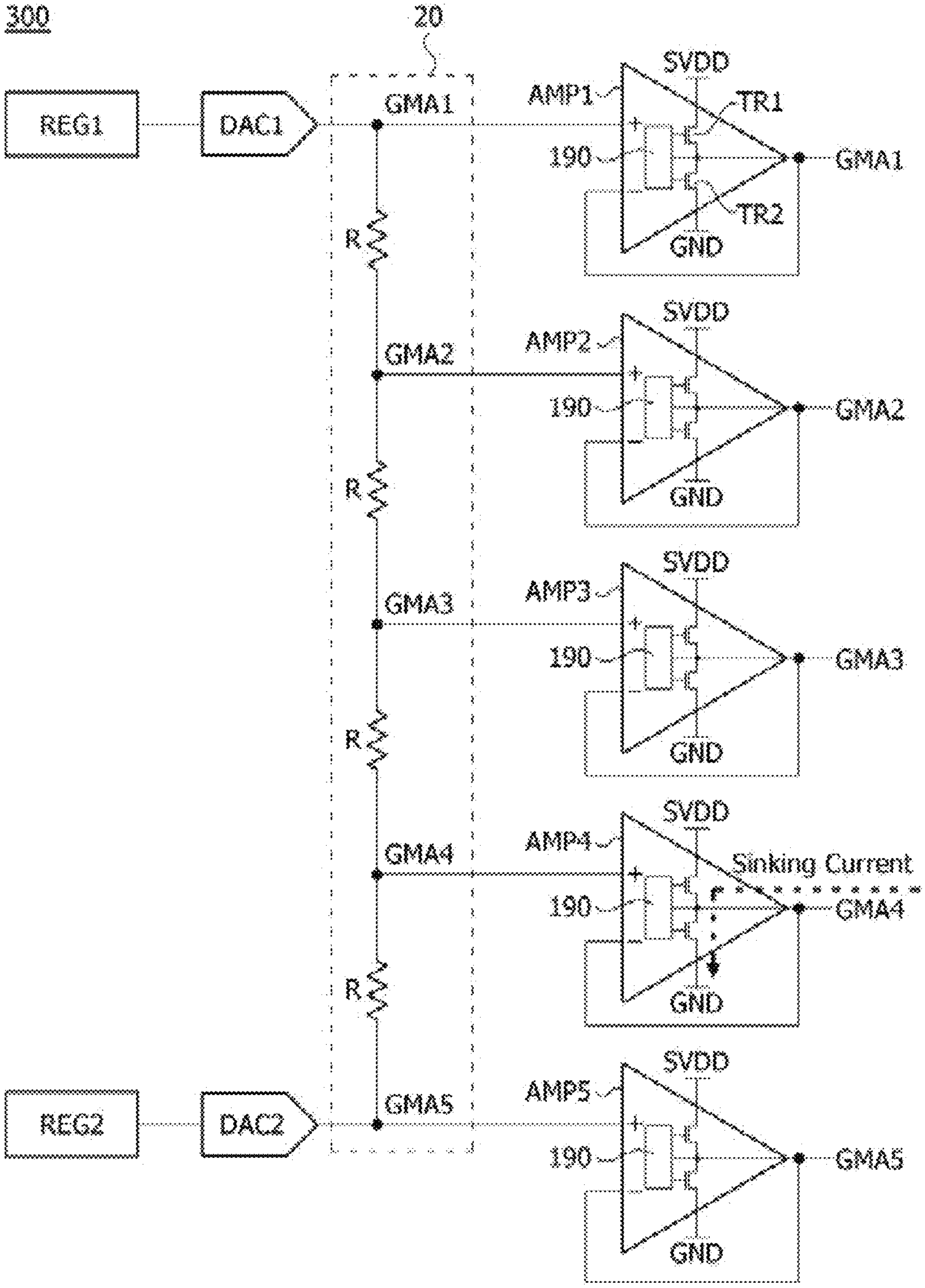

Referring to FIGS. 18 and 21, the gamma reference voltage output circuit 300 includes a plurality of the operational amplifiers AMP1 to AMP5 connected to output terminals, respectively, and a sensing circuit. The sensing circuit includes a first sensing part 310, shown in FIGS. 19 and 22, and a second sensing part 320, shown in FIGS. 20 and 23.

The gamma reference voltage output circuit 300 includes a first register REG1, a second register REG2, a first DAC DAC1 connected between the first register REG1 and a first operational amplifier AMP1, a second DAC DAC2 connected between the second register REG2 and a fifth operational amplifier AMP5, and a voltage division circuit 20 connected between an output terminal of the first DAC DAC1 and an output terminal of the second DAC DAC2.

Each of the operational amplifiers AMP1 to AMP5 includes an SVDD terminal to which the driving voltage is applied, a ground terminal GND to which the ground voltage is applied, a non-inverting input terminal (+) to which the corresponding gamma reference voltage is input, an output terminal from which the corresponding gamma reference voltage is output, an inverting input terminal (−) connected to the output terminal, a first transistor TR1 connected between the SVDD terminal and the output terminal, a second transistor TR2 connected between the ground terminal GND and the output terminal, and a control part 190 for controlling each of the transistors TR1 and TR2. The first transistor TR1 can be implemented as a p-channel transistor, and the second transistor TR2 can be implemented as an n-channel transistor. The operational amplifiers AMP1 to AMP5 may not include an individual sensing circuit as in the embodiments described above. In this embodiment, the connection nodes directly connecting the operational amplifiers AMP1 to AMP5 are omitted.

In each of the operational amplifiers AMP1 to AMP5, the control part 190 controls the gate voltages of the first and second transistors TR1 and TR2 through its first and second control signal terminals to output the target voltage for the corresponding gamma reference voltage. The first to fifth gamma reference voltages GMA1 to GMA5 output from the operational amplifiers AMP1 to AMP5 are supplied to the data driver 110. The first gamma reference voltage GMA1 is the highest gamma reference voltage with the highest voltage level, and the fifth gamma reference voltage GMA5 is the lowest gamma reference voltage with the lowest voltage level. The second gamma reference voltage GMA2 is a voltage that is lower than the first gamma reference voltage GMA1 and higher than the third gamma reference voltage GMA3. The third gamma reference voltage GMA3 is a voltage that is lower than the second gamma reference voltage GMA2 and higher than the fourth gamma reference voltage GMA4. The fourth gamma reference voltage GMA4 is a voltage that is lower than the third gamma reference voltage GMA3 and higher than the fifth gamma reference voltage GMA5.

A sensing circuit is connected to the output terminals of the operational amplifiers AMP1 to AMP5 to sense the overcurrent flowing through the output terminals.

Figure 19:
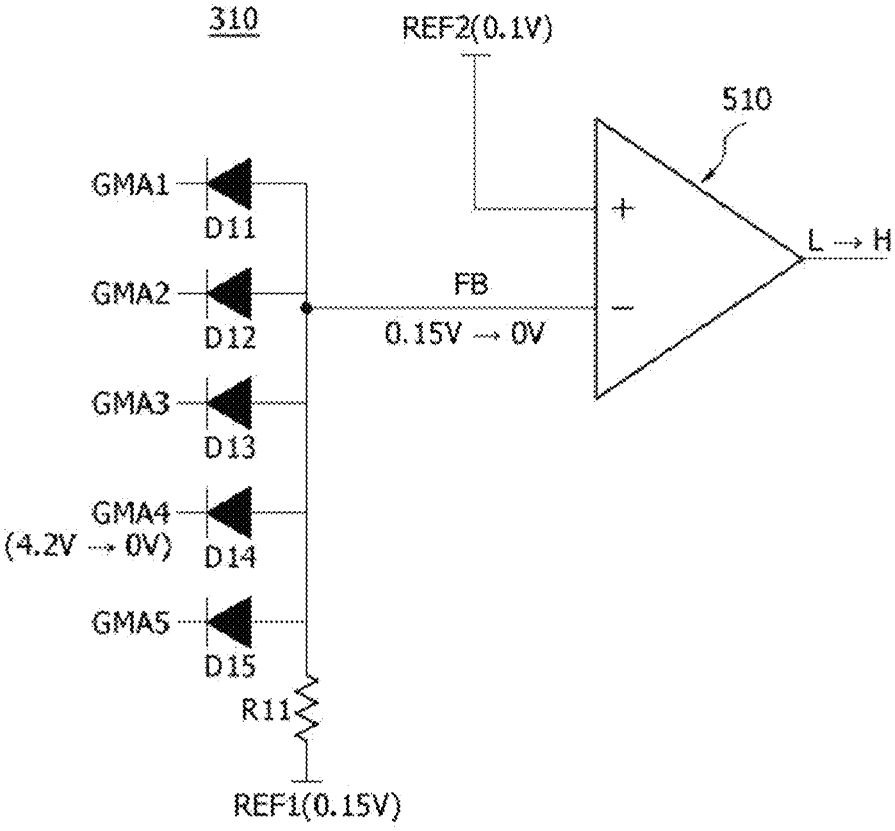
Figure 22:
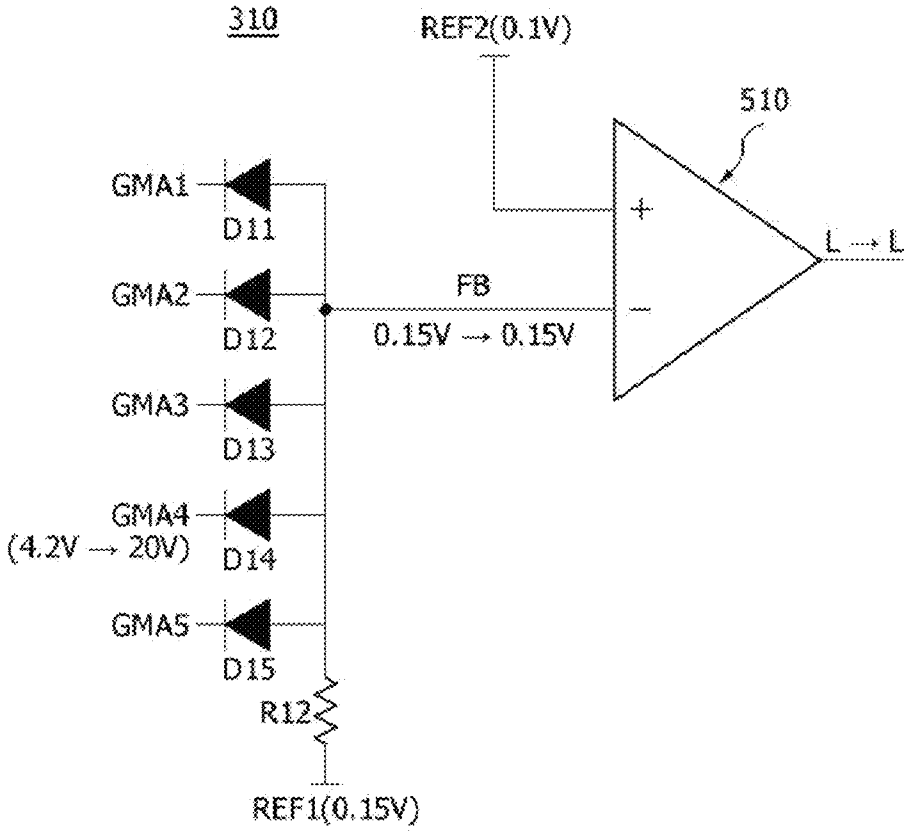

Referring to FIGS. 19 and 22, a first sensing part 310 includes a plurality of first diodes D11 to D15 connected in the reverse direction between the output terminals of the operational amplifiers AMP1 to AMP5 and the inverting input terminal (−) of the first comparator 510.

Cathode electrodes of the first diodes D11 to D15 are connected in a one-to-one correspondence with the output terminals of the corresponding operational amplifiers. For example, the cathode electrode of the first-first diode D11 is connected to the first output terminal from which the first gamma reference voltage GMA1 is output. The cathode electrode of the first-second diode D12 is connected to the second output terminal from which the second gamma reference voltage GMA2 is output. The cathode electrode of the first-third diode D13 is connected to the third output terminal from which the third gamma reference voltage GMA3 is output. The cathode electrode of the first-fourth diode D14 is connected to the fourth output terminal from which the fourth gamma reference voltage GMA4 is output. The cathode electrode of the first-fifth diode D15 is connected to the fifth output terminal from which the fifth gamma reference voltage GMA5 is output.

The anode electrodes of the first diodes D11 to D15 are connected in common to the inverting input terminal (−) of the first comparator 510. A first reference voltage REF1 is applied to the anode electrodes of the first diodes D11 to D15. The first reference voltage REF1 can be applied to the anode electrodes of the diodes D11 to D15 through a resistor R11.

The first reference voltage REF1 can be set arbitrarily by the user under the condition that it is lower than the target voltage for the gamma reference voltages GMA1 to GMA5 to be sensed. For example, the first reference voltage REF1 can be, but is not limited to, 0.15V lower than the fifth gamma reference voltage GMA5, which is the lowest gamma reference voltage.

The first comparator 510 can be implemented as an operational amplifier. The operational amplifier used as the first comparator 510 includes a non-inverting input terminal (+) to which a second reference voltage REF2 is input, an inverting input terminal (−) connected to the anode electrodes of the first diodes D11 to D15 and to which a feedback signal FB is input, and an output terminal (−) from which the error signal of the certain logic value (H) is output when the overcurrent is sensed. The second reference voltage REF2 can be set to, but is not limited to, a voltage corresponding to the first threshold, for example, 0.1V that is lower than the first reference voltage REF1.

Figure 23:
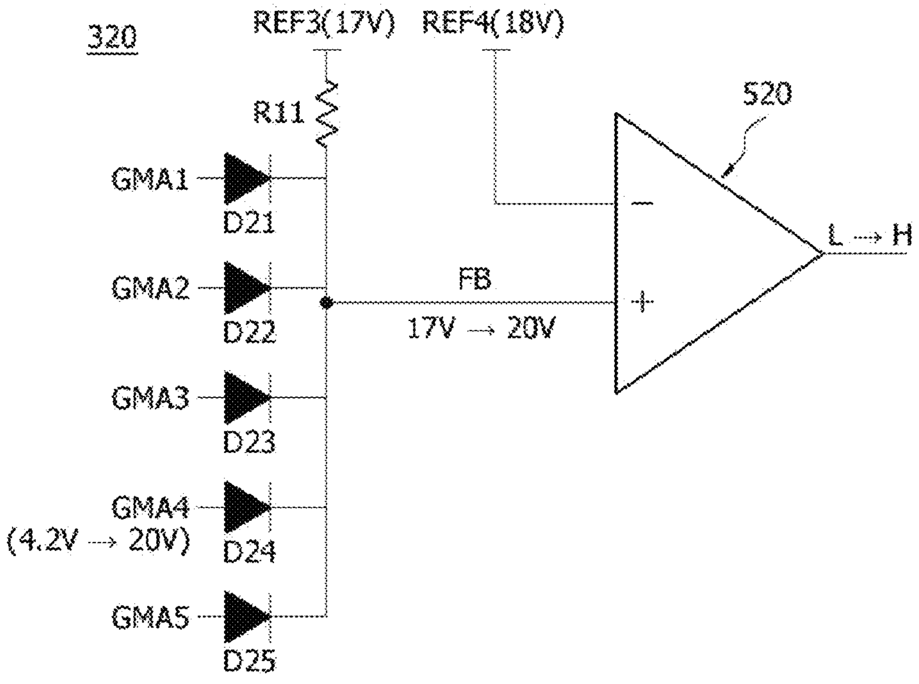

Referring to FIGS. 20 and 23, a second sensing part 320 includes a plurality of second diodes D21 to D25 connected in the forward direction between the output terminals of the operational amplifiers AMP1 to AMP5 and the non-inverting input terminal (+) of a second comparator 520.

Anode electrodes of the second diodes D21 to D25 are connected in a one-to-one correspondence with the output terminals of the corresponding operational amplifiers. For example, the anode electrode of the second-first diode D21 is connected to the first output terminal from which the first gamma reference voltage GMA1 is output. The anode electrode of the second-second diode D22 is connected to the second output terminal from which the second gamma reference voltage GMA2 is output. The anode electrode of the second-third diode D23 is connected to the third output terminal from which the third gamma reference voltage GMA3 is output. The anode electrode of the second-fourth diode D24 is connected to the fourth output terminal from which the fourth gamma reference voltage GMA4 is output. The anode electrode of the second-fifth diode D25 is connected to the fifth output terminal from which the fifth gamma reference voltage GMA5 is output.

The cathode electrodes of the second diodes D21 to D25 are connected in common to the non-inverting input terminal (+) of the second comparator 520. A third reference voltage REF3 is applied to the cathode electrodes of the second set of diodes D21 to D25. The third reference voltage REF3 can be applied to the cathode electrodes of the second diodes D21 to D25 through a resistor R12.

The third reference voltage REF3 can be arbitrarily set by the user under the condition that it is higher than the target voltage for the gamma reference voltages GMA1 to GMA5 to be sensed. For example, the third reference voltage REF3 can be, but is not limited to, 16.5V or 17V that is higher than the first gamma reference voltage GMA1, which is the highest gamma reference voltage.

The second comparator 520 can be implemented as an operational amplifier. The operational amplifier used as the second comparator 520 includes an inverting input terminal (−) to which a fourth reference voltage REF4 is input, a non-inverting input terminal (+) connected to the cathode electrodes of the second diodes D21 to D25 and to which a feedback signal FB is input, and an output terminal (+) from which the error signal of the certain logic value (H) is output when the overcurrent is sensed. A fourth reference voltage REF4 can be set to, but is not limited to, a voltage corresponding to the second threshold, for example, 18V that is higher than the third reference voltage REF3.

In a case where the voltage output from each of the output terminals of the gamma reference voltage output circuit 300 is normally output as the target voltage, all of the diodes D11 to D15 and D21 to D25 are in the off-state because reverse biases are applied to them. In this case, the output logic values of the first and second comparators 510 and 520 are unchanged and remain at the low logic value (L).

Referring to FIGS. 18 to 20, when any of the output terminals is short-circuited to a voltage lower than the gamma reference voltage, such as ground voltage (0V), a sourcing current flows through that output terminal. For example, as shown in FIG. 18, a sourcing current can be applied to the fourth output terminal from which the fourth gamma reference voltage GMA4 is output, such that the fourth gamma reference voltage GMA4 is reduced from 4.2V to 0V, thereby turning on the first to fourth diodes D14. When the first-fourth diode D14 is turned on, the voltage at the inverting input terminal (−) of the first comparator 510 is discharged to 0V, which is the cathode voltage of the first-4 diode D14. In this case, the voltage of the feedback signal FB applied to the inverting input terminal (−) of the first comparator 510 is reduced to 0V. As a result, the first comparator 510 outputs an error signal of high logic value (H) because a non-inverting input voltage becomes higher than an inverting input voltage. When the sourcing current flows, the second diodes D21 to D24 are in the off-state, and thus the output logic value of the second comparator 520 remains a low logic value (L).

Referring to FIGS. 21 to 23, when any of the output terminals is short-circuited to a voltage higher than the gamma reference voltage, such as 20V, a sinking sourcing current flows through that output terminal. For example, as shown in FIG. 23, a sinking current flows through the fourth output terminal from which the fourth gamma reference voltage GMA4 is output, causing the fourth gamma reference voltage GMA4 to rise from 4.2V to 20V, which turns on the second-fourth diode D24. When the second-fourth diode D24 is turned on, 20V is applied to the non-inverting input terminal (+) of the second comparator 520 through the second-fourth diode D24, which raises the voltage of the feedback signal FB to 20V. As a result, the second comparator 520 outputs an error signal of high logic value (H) because the non-inverting input voltage becomes higher than the inverting input voltage. When the sinking current flows, the second diodes D11 to D14 are in the off-state, and thus the output logic value of the second comparator 510 remains a low logic value (L).

FIGS. 24 to 29 are circuit diagrams illustrating a gamma reference voltage output circuit according to a fifth embodiment of the present disclosure.

Figure 24:
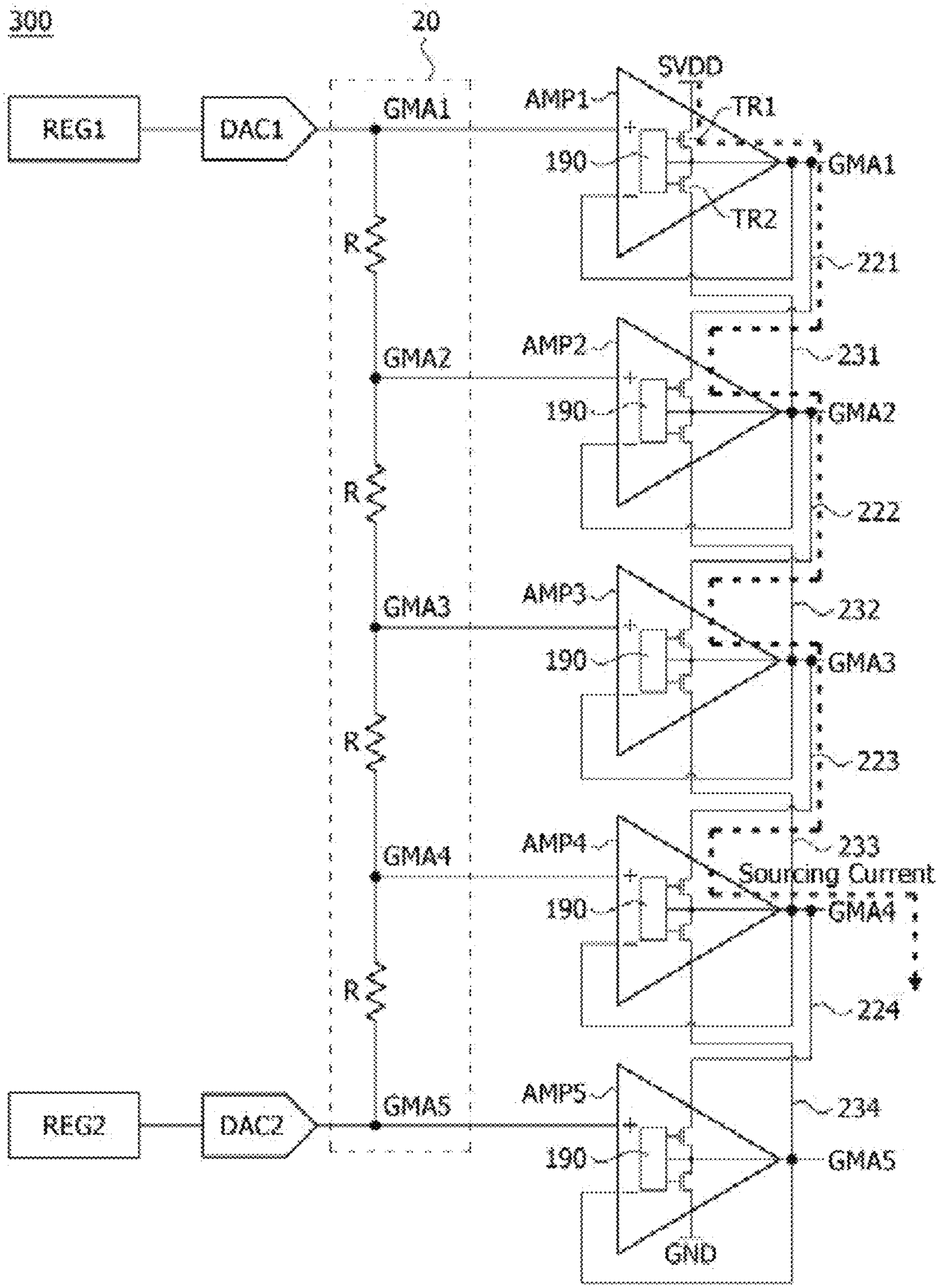
FIGS. 24 to 29 are circuit diagrams illustrating a gamma reference voltage output circuit according to a fifth embodiment of the present disclosure.
Figure 26:
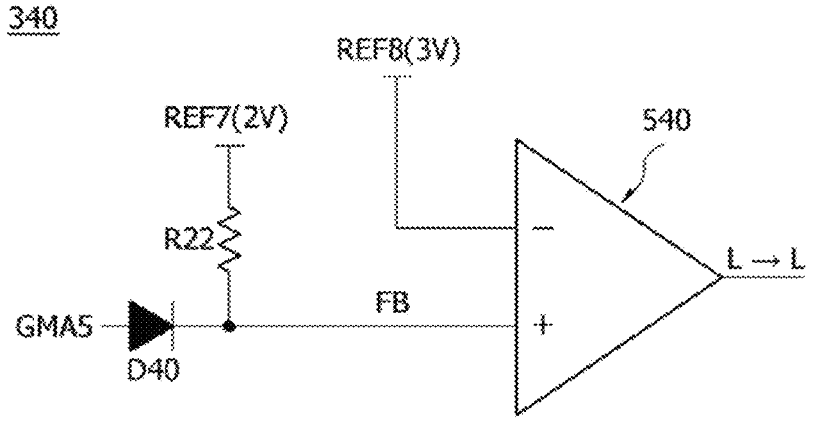
Figure 27:
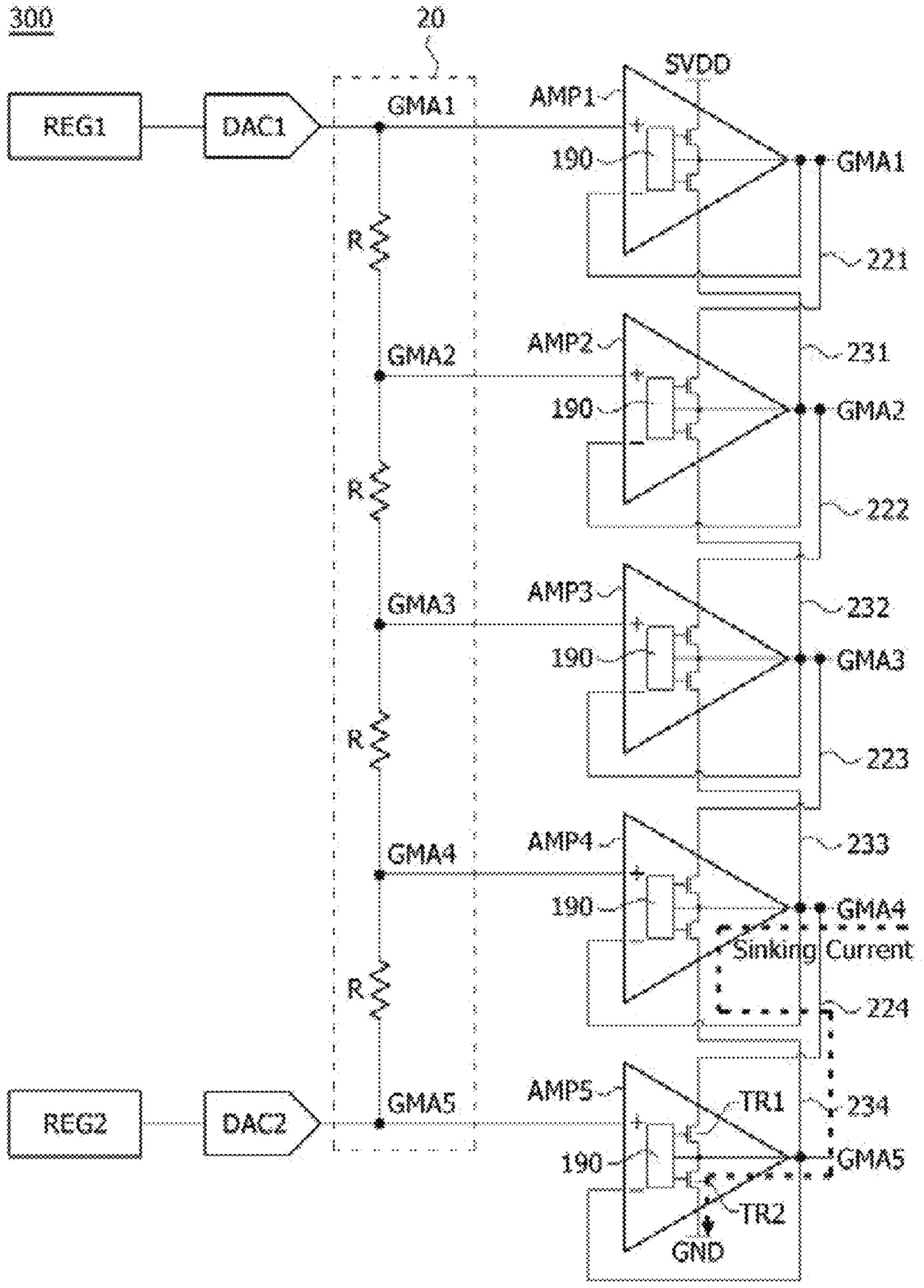

Referring to FIGS. 24 and 27, the gamma reference voltage output circuit 300 includes a plurality of operational amplifiers AMP1 to AMP5 connected to output terminals, respectively, and a sensing circuit connected to the output terminals. The sensing circuit includes a first sensing part 330, shown in FIGS. 25 and 28, and a second sensing part 340, shown in FIGS. 26 and 29.

The gamma reference voltage output circuit 300 includes a first register REG1, a second register REG2, a first DAC DAC1 connected between the first register REG1 and a first operational amplifier AMP1, a second DAC DAC2 connected between the second register REG2 and a fifth operational amplifier AMP5, and a voltage division circuit 20 connected between an output terminal of the first DAC DAC1 and an output terminal of the second DAC DAC2.

Each of the operational amplifiers AMP1 to AMP5 includes an SVDD terminal, a ground terminal GND, a non-inverting input terminal (+), an inverting input terminal (−), an output terminal, a first transistor TR1, a second transistor TR2, and a control part 190. The operational amplifiers AMP1 to AMP5 do not have an individual sensing circuit as in the embodiments described above.

The operational amplifiers AMP1 to AMP5 can be cascade-connected through the first connection nodes 221 to 224 and the second connection nodes 231 to 234. For example, the first output terminal from which the first gamma reference voltage GMA1 is output is connected to the SVDD terminal of the second operational amplifier AMP2 through the first-first connection node 221. The ground terminal GND of the first operational amplifier AMP1 is connected to a second output terminal from which the second gamma reference voltage GMA2 is output through the second-first connection node 231. The second output terminal is connected to the SVDD terminal of the third operational amplifier AMP3 through the first-second connection node 222. The ground terminal GND of the second operational amplifier AMP2 is connected to a third output terminal from which the third gamma reference voltage GMA3 is output through the second-second connection node 232. The third output terminal is connected to the SVDD terminal of the fourth operational amplifier AMP4 through the first-third connection node 223. The ground terminal GND of the third operational amplifier AMP3 is connected to the fourth output terminal from which the fourth gamma reference voltage GMA4 is output through the second-third connection node 233. The fourth output terminal is connected to the SVDD terminal of the fifth operational amplifier AMP5 through the first-fourth connection node 224. The ground terminal GND of the fourth operational amplifier AMP4 is connected to the fifth output terminal from which the fifth gamma reference voltage GMA5 is output through the second-fourth connection node 234. A ground voltage is applied to the ground terminal GND of the fifth operational amplifier AMP5.

A sensing circuit is connected to the output terminals of the operational amplifiers AMP1 to AMP5 to sense the overcurrent flowing through the output terminals.

Figure 25:
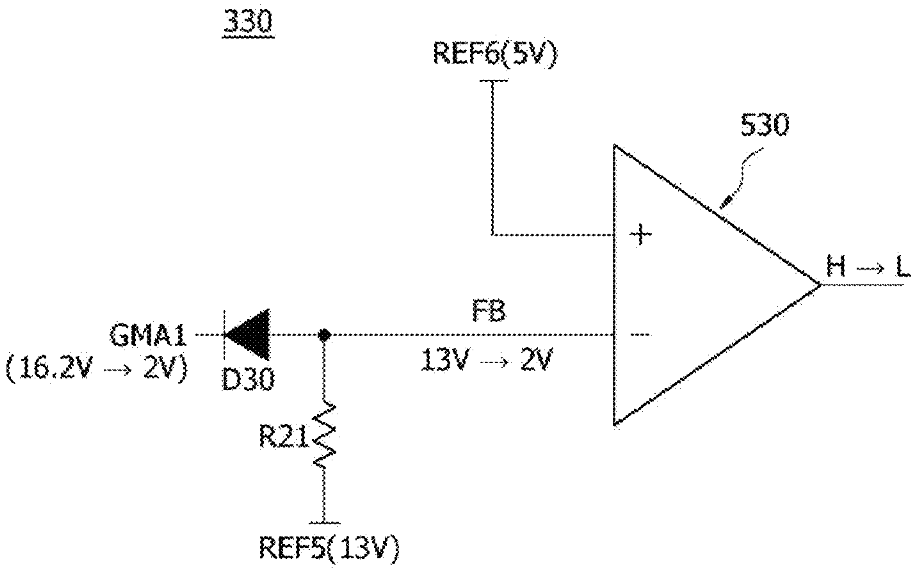
Figure 28:
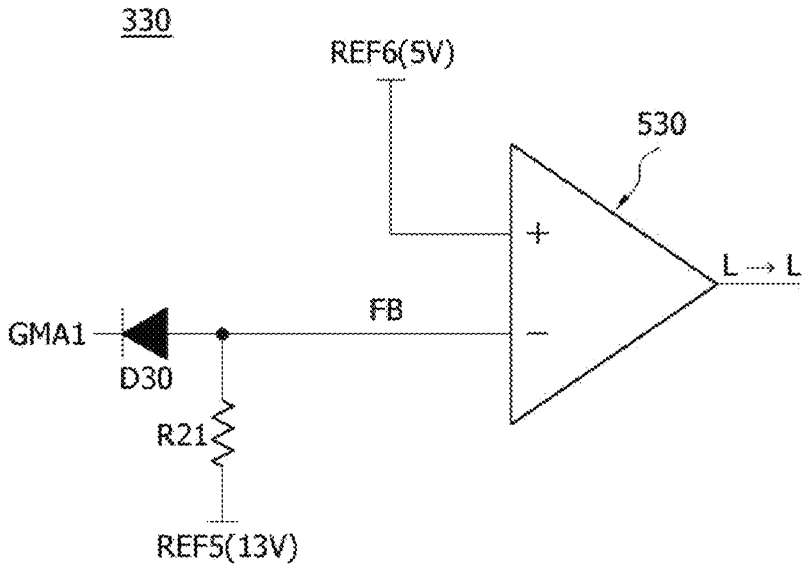

Referring to FIGS. 25 and 28, the first sensing part 330 includes a first diode D30 connected in the reverse direction between the first output terminal from which the first gamma reference voltage GMA1 is output and the inverting input terminal (−) of a first comparator 530.

A cathode electrode of the first diode D30 is connected to the first output terminal, and an anode electrode thereof is connected to the inverting input terminal (−) of the first comparator 530. A first reference voltage REF5 is applied to the anode electrode of the first diode D30 and the inverting input terminal (−) of the first comparator 530 through a resistor R21. A second reference voltage REF6 is applied to the non-inverting input terminal (+) of the first comparator 530. The first reference voltage REF5 is set to a higher voltage than the second reference voltage REF6 so that the output of the first comparator 530 is not changed in a condition in which the gamma reference voltages GMA1 through GMA5 are normally output. For example, but not limited to, the first reference voltage REF5 can be set to 13V and the second reference voltage REF6 can be set to 5V.

The first comparator 530 can be implemented as an operational amplifier. The operational amplifier used as the first comparator 530 includes a non-inverting input terminal (+) to which the second reference voltage REF6 is input, an inverting input terminal (−) to which the feedback signal FB is input connected to the anode electrode of the first diode D30, and an output terminal (−) from which the error signal of the certain logic value (H) is output when the overcurrent is sensed.

Figure 29:
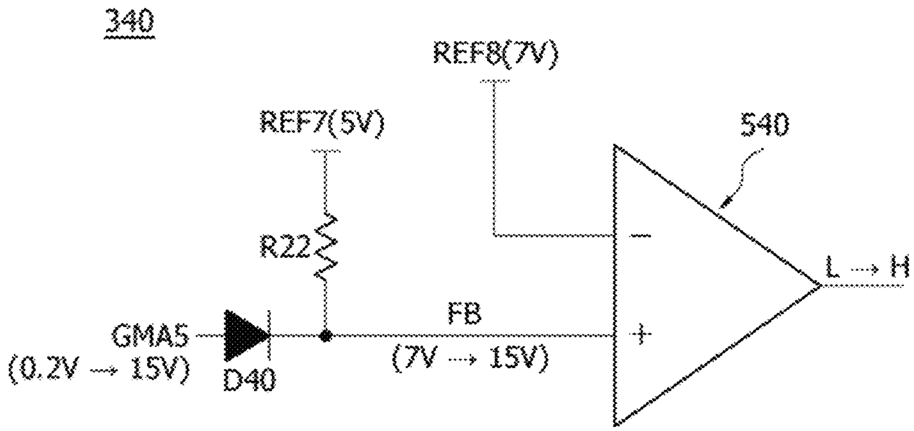

Referring to FIGS. 26 and 29, the second sensing part 340 includes a second diode D40 connected in the forward direction between the fifth output terminal from which the fifth gamma reference voltage GMA5 is output and the non-inverting input terminal (+) of a second comparator 540.

An anode electrode of the second diode D40 is connected to the fifth output terminal, and a cathode electrode thereof is connected to the non-inverting input terminal (+) of the second comparator 540. A third reference voltage REF7 is applied to the cathode electrode of the second diode D40 and the non-inverting input terminal (+) of the second comparator 540 through a resistor R22. A fourth reference voltage REF8 is applied to the inverting input terminal (−) of the second comparator 540. The third reference voltage REF7 is set to a voltage lower than the fourth reference voltage REF8 so that the output of the second comparator 540 is not changed in a condition in which the gamma reference voltages GMA1 through GMA5 are normally output. For example, but not limited to, the third reference voltage REF7 can be set to 2V and the fourth reference voltage REF8 can be set to 3V.

The second comparator 540 can be implemented as an operational amplifier. The operational amplifier used as the second comparator 540 includes an inverting input terminal (−) to which the fourth reference voltage REF8 is input, a non-inverting input terminal (+) connected to the cathode electrode of the second diode D40 to which the feedback signal FB is input, and an output terminal (+) from which the error signal of the certain logic value H is output when the overcurrent is sensed.

In a condition in which the voltage output from each of the output terminals of the gamma reference voltage output circuit 300 is normally output as the target voltage, the diodes D30 and D40 are in the off-state because reverse biases are applied to them. In this case, the output logic values of the first and second comparators 530 and 540 are unchanged and remain at the low logic value (L).

Referring to FIGS. 24 to 26, when any of the output terminals is short-circuited to a voltage lower than the gamma reference voltage, a sourcing current flows to that output terminal. For example, as shown in FIG. 24, when the sourcing current is applied to the fourth output terminal from which the fourth gamma reference voltage GMA4 is output, causing the fourth gamma reference voltage GMA4 to decrease, the first to third gamma reference voltages GMA1 to GMA3 coupled to the fourth gamma reference voltage GMA4 through the connection nodes 221, 222, and 223 can also be decreased, causing the first diode D30 to turn on. For example, the first gamma reference voltage GMA1 can be reduced from 16.2V to 2V. In this case, the voltage of the feedback signal FB applied to the inverting input terminal (−) of the first comparator 530 is decreased from 13V to 2V. As a result, the first comparator 530 outputs an error signal of high logic value (H) because a non-inverting input voltage becomes higher than an inverting input voltage. When the sourcing current flows, the second diode D40 is in the off-state, and thus the output logic value of the second comparator 540 remains the low logic value (L).

Referring to FIGS. 27 to 29, when any of the output terminals is short-circuited to a voltage higher than the gamma reference voltage, such as 20V, the sinking sourcing current flows through that output terminal. For example, as shown in FIG. 27, when the sinking current is applied to the fourth output terminal from which the fourth gamma reference voltage GMA4 is output, causing the fourth gamma reference voltage GMA4 to increase, the fifth gamma reference voltage GMA5 connected to the fourth gamma reference voltage GMA4 through the connection node 234 can also increase, causing the second diode D40 to turn on. For example, the fifth gamma reference voltage GMA2 can be increased from 0.2V to 15V. In this time, the voltage of the feedback signal FB applied to the non-inverting input terminal (+) of the second comparator 540 is increased to 15V. As a result, the second comparator 540 outputs the error signal of the high logic value (H) because the non-inverting input voltage becomes higher than the inverting input voltage. When the sinking current flows, the first diode D30 is in the off-state, and thus the output logic value of the first comparator 530 remains the low logic value (L).

The host system 200 can include a mobile device, a video phone, a smart watch, a watch phone, a wearable apparatus, a foldable apparatus, a rollable apparatus, a bendable apparatus, a flexible apparatus, a curved apparatus, a sliding apparatus, a variable apparatus, an electronic notebook, an e-book, a portable multimedia player (PMP), a personal digital assistant (PDA), an MP3 player, a mobile medical device, a desktop PC, a laptop PC, a netbook computer, a workstation, a navigation, an in-vehicle display device, an in-theater display device, a television, a wallpaper device, a signage device, a gaming device, a laptop, a monitor, a camera, a camcorder, and a main board of a consumer electronics device. Further, the display device of the present disclosure can be applicable to an organic light-emitting illumination device or an inorganic light-emitting illumination device.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A gamma reference voltage output circuit comprising:
 an (N)th operational amplifier configured to output an (N)th gamma reference voltage through an (N)th output terminal, where N is a natural number;
 an (N+1)th operational amplifier configured to output an (N+1)th gamma reference voltage that is lower than the (N)th gamma reference voltage, through an (N+1)th output terminal;
 an (N+2)th operational amplifier configured to output an (N+2)th gamma reference voltage that is lower than the (N+1)th gamma reference voltage, to an (N+2)th output terminal; and
 at least one node to which a power terminal of one of adjacent operational amplifiers among the (N)th operational amplifier, the (N+1)th operational amplifier, and the (N+2)th operational amplifier is electrically connected to an output terminal of another operational amplifier.

2. The gamma reference voltage output circuit of claim 1, wherein
 each of the (N)th operational amplifier, the (N+1)th operational amplifier, and the (N+2)th operational amplifier includes a first power terminal and a second power terminal, and
 the at least one node includes:
  a first connection node configured to connect the (N)th output terminal to the first power terminal of the (N+1)th operational amplifier; and
  a second connection node configured to connect the (N+1)th output terminal to the first power terminal of the (N+2)th operational amplifier.

3. The gamma reference voltage output circuit of claim 2, wherein
 a driving voltage is applied to the first power terminal of the (N)th operational amplifier,
 a ground voltage is applied to the second power terminal of the (N)th operational amplifier, and
 the ground voltage is applied to the second power terminal of the (N+2)th operational amplifier.

4. The gamma reference voltage output circuit of claim 3, wherein the (N)th operational amplifier further includes:
 a first transistor connected between the first power terminal and the (N)th output terminal of the (N)th operational amplifier;
 a second transistor connected between the (N)th output terminal, and the second power terminal of the (N)th operational amplifier;
 a control part configured to control a gate voltage of each of the first transistor of the (N)th operational amplifier and the second transistor of the (N)th operational amplifier;
 a first sensing part configured to sense a current flowing through the first transistor of the (N)th operational amplifier; and
 a second sensing part configured to sense a current flowing through the second transistor of the (N)th operational amplifier.

5. The gamma reference voltage output circuit of claim 3, wherein the (N+1)th operational amplifier further includes:
 a first transistor connected between the first power terminal and the (N+1)th output terminal of the (N+1)th operational amplifier;
 a second transistor connected between the (N+1)th output terminal, and the second power terminal of the (N+1)th operational amplifier;
 a control part configured to control a gate voltage of each of the first transistor of the (N+1)th operational amplifier and the second transistor of the (N+1)th operational amplifier; and
 a sensing part configured to sense a current flowing through the second transistor of the (N+1)th operational amplifier, and
 wherein the (N+2)th operational amplifier further includes:
  a first transistor connected between the first power terminal and the (N+2)th output terminal of the (N+2)th operational amplifier;
  a second transistor connected between the (N+2)th output terminal, and the second power terminal of the (N+2)th operational amplifier;
  a control part configured to control a gate voltage of each of the first transistor of the (N+2)th operational amplifier and the second transistor of the (N+2)th operational amplifier; and
  a sensing part configured to sense a current flowing through the second transistor of the (N+2)th operational amplifier.

6. The gamma reference voltage output circuit of claim 1, wherein
 each of the (N)th operational amplifier, the (N+1)th operational amplifier, and the (N+2) operational amplifier includes a first power terminal and a second power terminal, and
 the at least one connection node includes:
  a first connection node configured to connect the second power terminal of the (N)th operational amplifier to the (N+1)th output terminal; and
  a second connection node configured to connect the second power terminal of the (N+1)th operational amplifier to the (N+2)th output terminal.

7. The gamma reference voltage output circuit of claim 6, wherein a driving voltage is applied to the first power terminal of the (N)th operational amplifier;
 a ground voltage is applied to the second power terminal of the (N+2)th operational amplifier.

8. The gamma reference voltage output circuit of claim 7, wherein the (N)th operational amplifier further includes:
 a first transistor connected between the first power terminal and the (N)th output terminal of the (N)th operational amplifier;
 a second transistor connected between the (N)th output terminal, and the second power terminal of the (N)th operational amplifier;

a control part configured to control a gate voltage of each of the first transistor of the (N)th operational amplifier and the second transistor of the (N)th operational amplifier; and a sensing part configured to sense a current flowing through the first transistor of the (N)th operational amplifier, and wherein the (N+1)th operational amplifier further includes:

a first transistor connected between the first power terminal and the (N+1)th output terminal of the (N+1)th operational amplifier;

a second transistor connected between the (N+1)th output terminal, and the second power terminal of the (N+1)th operational amplifier;

a control part configured to control a gate voltage of each of the first transistor of the (N+1)th operational amplifier and the second transistor of the (N+1)th operational amplifier; and a sensing part configured to sense a current flowing through the first transistor of the (N+1)th operational amplifier.

9. The gamma reference voltage output circuit of claim 7, wherein the (N+2)th operational amplifier further includes:

a first transistor connected between the first power terminal and the (N+2)th output terminal of the (N+2)th operational amplifier;

a second transistor connected between the (N+2)th output terminal, and the second power terminal of the (N+2)th operational amplifier;

a control part configured to control a gate voltage of each of the first transistor of the (N+2)th operational amplifier and the second transistor of the (N+2)th operational amplifier;

a first sensing part configured to sense a current flowing through the first transistor of the (N+2)th operational amplifier; and a second sensing part configured to sense a current flowing through the second transistor of the (N+2)th operational amplifier.

10. The gamma reference voltage output circuit of claim 1, wherein each of the (N)th operational amplifier, the (N+1)th operational amplifier, and the (N+2) operational amplifier includes a first power terminal and a second power terminal, and wherein the at least one connection node includes:

a first-first connection node configured to connect the (N)th output terminal to the first power terminal of the (N+1)th operational amplifier;

a first-second connection node configured to connect the (N+1)th output terminal to the first power terminal of the (N+2) operational amplifier;

a second-first connection node configured to connect the second power terminal of the (N)th operational amplifier to the (N+1)th output terminal; and a second-second connection node configured to connect the second power terminal of the (N+1)th operational amplifier to the (N+2)th output terminal.

11. The gamma reference voltage output circuit of claim 10, wherein a driving voltage is applied to the first power terminal of the (N)th operational amplifier, and the ground voltage is applied to the second power terminal of the (N+2)th operational amplifier.

12. The gamma reference voltage output circuit of claim 11, wherein the (N)th operational amplifier further includes:

a first transistor connected between the first power terminal and the (N)th output terminal of the (N)th operational amplifier;

a second transistor connected between the (N)th output terminal, and the second power terminal of the (N)th operational amplifier;

a control part configured to control a gate voltage of each of the first transistor of the (N)th operational amplifier and the second transistor of the (N)th operational amplifier; and a sensing part configured to sense a current flowing through the first transistor of the (N)th operational amplifier, wherein the (N+1)th operational amplifier further includes:

a first transistor connected between the first power terminal and the (N+1)th output terminal of the (N+1)th operational amplifier;

a second transistor connected between the (N+1)th output terminal, and the second power terminal of the (N+1)th operational amplifier; and a control part configured to control a gate voltage of each of the first transistor of the (N+1)th operational amplifier and the second transistor of the (N+1)th operational amplifier, and wherein the (N+2)th operational amplifier further includes:

a first transistor connected between the first power terminal and the (N+2)th output terminal of the (N+2)th operational amplifier;

a second transistor connected between the (N+2)th output terminal, and the second power terminal of the (N+2)th operational amplifier;

a control part configured to control a gate voltage of each of the first transistor of the (N+2)th operational amplifier and the second transistor of the (N+2)th operational amplifier; and a second sensing part configured to sense a current flowing through the second transistor of the (N+2)th operational amplifier.

13. The gamma reference voltage output circuit of claim 11, wherein each of the (N)th operational amplifier, the (N+1)th operational amplifier, and the (N+2)th operational amplifier includes:

a first transistor connected between the first power terminal and a corresponding output terminal;

a second transistor connected between the corresponding output terminal and the second power terminal; and a control part configured to control a gate voltage of each of the first transistor and the second transistor.

14. The gamma reference voltage output circuit of claim 11, further comprising:

a sensing circuit connected to at least one of the (N)th output terminal, the (N+1)th output terminal, and the (N+2)th output terminal.

15. The gamma reference voltage output circuit of claim 14, wherein the sensing circuit includes:

a first diode including a cathode electrode connected to the (N)th output terminal, and an anode electrode to which a first reference voltage is applied; and an operational amplifier including a non-inverting input terminal to which a second reference voltage is input, an inverting input terminal connected to the anode electrode of the first diode, and an output terminal from which an error signal is output.

16. The gamma reference voltage output circuit of claim 14, wherein the sensing circuit includes:

a second diode including an anode electrode connected to the (N+2)th output terminal, and a cathode electrode to which a third reference voltage is applied; and an operational amplifier including an inverting input terminal to which a fourth reference voltage is input, a non-inverting input terminal connected to the cathode electrode of the second diode, and an output terminal from which an error signal is output.

17. The gamma reference voltage output circuit of claim 1, further comprising:

a sensing circuit connected to at least one of the (N)th output terminal, the (N+1)th output terminal, and the (N+2)th output terminal.

18. The gamma reference voltage output circuit of claim 17, wherein the sensing circuit includes:

a first-first diode including a cathode electrode connected to the (N)th output terminal, and an anode electrode to which a first reference voltage is applied;

a first-second diode including a cathode electrode connected to the (N+1)th output terminal, and an anode electrode to which the first reference voltage is applied;

a first-third diode including a cathode electrode connected to the (N+2)th output terminal, and an anode electrode to which the first reference voltage is applied;

a first sensing operational amplifier including a non-inverting input terminal into which a second reference voltage is input, an inverting input terminal connected in common to anode electrodes of the first-first, first-second and first-third diodes, and an output terminal configured to output an error signal;

a second-first diode including an anode electrode connected to the (N)th output terminal, and a cathode electrode to which a third reference voltage is applied;

a second-second diode including an anode electrode connected to the (N+1)th output terminal, and a cathode electrode to which the third reference voltage is applied;

a second-third diode including an anode electrode connected to the (N+2)th output terminal, and a cathode electrode to which the third reference voltage is applied; and a second sensing operational amplifier including an inverting input terminal to which a fourth reference voltage is input, a non-inverting input terminal connected in common to the cathode electrodes of the second-first, second-second and second-third diodes, and an output terminal configured to output an error signal.

19. A display device comprising:

a gamma reference voltage output circuit configured to output gamma reference voltages with different voltage levels;

a data driving circuit configured to convert pixel data into a data voltage based on the gamma reference voltages; and a display panel having a plurality of data lines to which the data voltage is applied, wherein the gamma reference voltage output circuit includes:

an (N)th operational amplifier configured to output an (N)th gamma reference voltage through an (N)th output terminal, where N is a natural number;

an (N+1)th operational amplifier configured to output an (N+1)th gamma reference voltage that is lower than the (N)th gamma reference voltage, through an (N+1)th output terminal;

an (N+2)th operational amplifier configured to output an (N+2)th gamma reference voltage that is lower than the (N+1)th gamma reference voltage, to an (N+2)th output terminal; and one or more connection nodes to which a power terminal of one of adjacent operational amplifiers in the (N)th operational amplifier, the (N+1)th operational amplifier, and the (N+2)th operational amplifier is electrically connected to an output terminal of another of the adjacent operational amplifiers.

* * * * *